(12) United States Patent
Suyama et al.

(10) Patent No.: US 12,540,906 B2
(45) Date of Patent: Feb. 3, 2026

(54) RADIOGRAPHIC IMAGE PROCESSING METHOD, TRAINED MODEL, RADIOGRAPHIC IMAGE PROCESSING MODULE, RADIOGRAPHIC IMAGE PROCESSING PROGRAM, AND RADIOGRAPHIC IMAGE PROCESSING SYSTEM

(71) Applicant: HAMAMATSU PHOTONICS K.K., Hamamatsu (JP)

(72) Inventors: Toshiyasu Suyama, Hamamatsu (JP); Tatsuya Onishi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/918,397

(22) PCT Filed: Apr. 14, 2021

(86) PCT No.: PCT/JP2021/015489
§ 371 (c)(1),
(2) Date: Oct. 12, 2022

(87) PCT Pub. No.: WO2021/210618
PCT Pub. Date: Oct. 21, 2021

(65) Prior Publication Data
US 2023/0136930 A1 May 4, 2023

(30) Foreign Application Priority Data
Apr. 16, 2020 (JP) .................................. 2020-073578

(51) Int. Cl.
*G01N 23/04* (2018.01)
*G01N 23/083* (2018.01)
(Continued)

(52) U.S. Cl.
CPC .......... *G01N 23/04* (2013.01); *G01N 23/083* (2013.01); *G01N 23/087* (2013.01); *G01T 1/208* (2013.01);
(Continued)

(58) Field of Classification Search
CPC .... G01N 23/04; G01N 23/043; G01N 23/046; G01N 23/083; G01N 23/087;
(Continued)

(56) References Cited

U.S. PATENT DOCUMENTS 5,335,260 A * 8/1994 Arnold .................. A61B 6/583
378/207
5,565,678 A * 10/1996 Manian ................. A61B 6/583
378/207

(Continued)

FOREIGN PATENT DOCUMENTS

CN 102297873 A 12/2011
CN 103649990 A 3/2014
(Continued)

OTHER PUBLICATIONS

An English translation of JP2019168360A by Patent Translate (2025).*
(Continued)

*Primary Examiner* — Allen C. Ho
(74) *Attorney, Agent, or Firm* — Faegre Drinker Biddle & Reath LLP

(57) ABSTRACT

A control device includes an acquisition unit configured to acquire X-ray transmission images of a jig and a target object using an image acquisition device that radiates X-rays to the target object and captures an image of the X-rays passing through the target object to acquire an X-ray transmission image, a specification unit configured to specify image characteristics of the X-ray transmission image of the
(Continued)

jig, a selection unit configured to select a trained model on the basis of the image characteristics from a plurality of trained models constructed through machine training in advance using image data, and a processing unit configured to execute image processing for removing noise from the X-ray transmission image of the target object using the selected trained model.

14 Claims, 18 Drawing Sheets

(51) Int. Cl.
    *G01N 23/087*      (2018.01)
    *G01T 1/208*      (2006.01)

(52) U.S. Cl.
    CPC .............. *G01N 2223/04* (2013.01); *G01N 2223/1016* (2013.01); *G01N 2223/401* (2013.01); *G01N 2223/5015* (2013.01); *G01N 2223/505* (2013.01); *G06T 2207/10116* (2013.01); *G06T 2207/10121* (2013.01); *G06T 2207/20081* (2013.01); *G06T 2207/20182* (2013.01)

(58) Field of Classification Search
    CPC ........ G01N 23/10; G01N 23/16; G01N 23/18; G01N 2223/03; G01N 2223/04; G01N 2223/1016; G01N 2223/401; G01N 2223/5015; G01N 2223/505; G06T 2207/10116; G06T 2207/10121; G06T 2207/20081; G06T 2207/20182; A61B 6/5258; A61B 6/5282; A61B 6/582; A61B 6/583; A61B 6/585
    USPC ...................... 378/51–58, 207, 62
    See application file for complete search history.

(56) References Cited

U.S. PATENT DOCUMENTS

| | | | | |
|---|---|---|---|---|
| 5,585,603 | A * | 12/1996 | Vogeley, Jr. | G01G 9/005 177/1 |
| 5,687,210 | A * | 11/1997 | Maitrejean | G01N 23/083 378/57 |
| 5,917,877 | A * | 6/1999 | Chiabrera | G01N 23/046 378/207 |
| 6,173,038 | B1 * | 1/2001 | Siffert | A61B 6/505 378/207 |
| 6,198,795 | B1 * | 3/2001 | Naumann | G01V 5/224 378/57 |
| 6,201,850 | B1 * | 3/2001 | Heumann | G01N 23/044 378/22 |
| 6,231,231 | B1 * | 5/2001 | Farrokhnia | A61B 6/583 378/207 |
| 6,269,142 | B1 * | 7/2001 | Smith | G01V 5/22 378/57 |
| 6,315,447 | B1 * | 11/2001 | Nord | A61B 6/482 378/53 |
| 6,347,131 | B1 * | 2/2002 | Gusterson | G01B 15/00 378/57 |
| 6,370,223 | B1 * | 4/2002 | Gleason | G01N 33/12 378/54 |
| 6,398,408 | B1 * | 6/2002 | Polkus | A61B 6/583 378/207 |
| 6,516,045 | B2 * | 2/2003 | Shepherd | A61B 6/508 378/53 |
| 6,570,955 | B1 * | 5/2003 | Siffert | G01N 23/04 378/207 |
| 6,574,302 | B2 * | 6/2003 | Adriaansz | A61B 6/505 378/53 |
| 6,574,303 | B2 * | 6/2003 | Sawada | G01B 15/04 250/359.1 |
| 6,600,805 | B2 * | 7/2003 | Hansen | G01N 23/083 378/53 |
| 6,632,020 | B2 * | 10/2003 | Kaufhold | A61B 6/583 378/207 |
| 6,661,868 | B2 * | 12/2003 | Sawada | G01N 23/04 378/57 |
| 6,872,949 | B2 * | 3/2005 | Mizuoka | G01N 23/04 250/361 R |
| 7,050,534 | B2 * | 5/2006 | Lang | G01N 23/04 378/54 |
| 7,260,177 | B2 * | 8/2007 | Hirose | G06T 7/0004 250/359.1 |
| 7,311,440 | B2 * | 12/2007 | Yoon | A61B 6/512 378/207 |
| 7,467,892 | B2 * | 12/2008 | Lang | A61B 6/563 378/207 |
| 7,477,726 | B2 * | 1/2009 | Kabumoto | G01N 23/083 378/57 |
| 7,570,787 | B2 * | 8/2009 | Hirose | G01N 23/04 250/359.1 |
| 7,696,480 | B2 * | 4/2010 | Kostka | G01N 23/083 378/53 |
| 7,746,976 | B2 * | 6/2010 | Huo | A61B 6/4233 378/53 |
| 7,980,760 | B2 * | 7/2011 | Kabumoto | G01N 23/04 378/207 |
| 7,991,110 | B2 * | 8/2011 | Hirose | G01N 23/02 378/57 |
| 8,068,656 | B2 * | 11/2011 | Hirose | G01G 9/005 378/207 |
| 8,077,827 | B2 * | 12/2011 | Perng | G01B 15/025 378/207 |
| 8,223,922 | B2 * | 7/2012 | Suyama | G01V 5/224 378/53 |
| 8,280,005 | B2 * | 10/2012 | Suyama | G01N 23/04 378/53 |
| 8,639,010 | B2 * | 1/2014 | Adachi | A61B 6/585 382/132 |
| 8,858,076 | B2 * | 10/2014 | Quintana | G21K 1/10 378/207 |
| 8,873,825 | B2 | 10/2014 | Mercuriev | |
| 8,938,110 | B2 * | 1/2015 | Goshen | G06T 5/70 382/254 |
| 8,983,234 | B2 * | 3/2015 | Holt | A61B 6/583 382/294 |
| 8,989,345 | B2 * | 3/2015 | Kim | G01N 9/24 378/207 |
| 9,081,998 | B2 * | 7/2015 | Hao | G01N 23/04 |
| 9,413,995 | B2 | 8/2016 | Ohguri | |
| 9,547,889 | B2 * | 1/2017 | Goshen | A61B 6/032 |
| 9,615,808 | B2 * | 4/2017 | Mentrup | A61B 6/4291 |
| 9,619,906 | B2 * | 4/2017 | Choi | G06T 5/73 |
| 9,877,696 | B2 * | 1/2018 | Taki | A61B 6/544 |
| 9,886,765 | B2 * | 2/2018 | Naito | G06T 7/60 |
| 9,943,282 | B2 * | 4/2018 | Katsumata | A61B 6/5205 |
| 10,010,304 | B2 | 7/2018 | Morita | |
| 10,242,443 | B2 * | 3/2019 | Hsieh | G06T 7/0012 |
| 10,430,708 | B1 * | 10/2019 | Hu | G06T 5/70 |
| 10,697,904 | B2 * | 6/2020 | Yamakawa | G01N 23/04 |
| 10,803,555 | B2 * | 10/2020 | Song | G06N 3/048 |
| 10,820,197 | B2 * | 10/2020 | Rosenberg | H04W 8/06 |
| 10,824,857 | B2 * | 11/2020 | Flohr | G06T 7/0014 |
| 10,832,381 | B2 * | 11/2020 | Strobel | G06T 5/70 |
| 10,888,296 | B2 * | 1/2021 | Ji | A61B 6/4417 |
| 10,949,951 | B2 * | 3/2021 | Tang | G16H 30/20 |
| 10,970,887 | B2 * | 4/2021 | Wang | A61B 5/00 |
| 10,984,564 | B2 * | 4/2021 | Bergner | G06T 11/005 |
| 11,079,344 | B2 * | 8/2021 | Suyama | G01N 23/04 |
| 11,126,914 | B2 * | 9/2021 | Thibault | G06N 20/00 |
| 11,166,694 | B2 * | 11/2021 | Takagi | A61B 6/587 |
| 11,185,302 | B2 * | 11/2021 | Tsuchiya | G06T 7/70 |
| 11,195,277 | B2 * | 12/2021 | Shanbhag | G06T 11/008 |
| 11,244,480 | B2 * | 2/2022 | Teshigawara | G16H 30/40 |
| 11,257,196 | B2 * | 2/2022 | Kaneko | G06T 11/008 |
| 11,324,472 | B2 * | 5/2022 | Hamill | A61B 6/583 |
| 11,386,592 | B2 * | 7/2022 | Paysan | G06T 7/0012 |
| 11,436,720 | B2 * | 9/2022 | Gong | G06N 3/045 |

(56) References Cited

U.S. PATENT DOCUMENTS

| | | | |
|---|---|---|---|
| 11,501,431 B2 * | 11/2022 | Xiao | G06T 7/155 |
| 11,517,197 B2 * | 12/2022 | Zhou | G06T 11/005 |
| 11,574,170 B2 * | 2/2023 | Isogawa | G06T 5/70 |
| 11,710,230 B2 * | 7/2023 | Takeshima | A61B 5/0035 382/128 |
| 11,798,159 B2 * | 10/2023 | Zhou | G06F 18/241 |
| 11,972,559 B2 * | 4/2024 | Hamauzu | A61B 17/29 |
| 12,094,037 B2 | 9/2024 | Takahashi | |
| 12,141,965 B2 * | 11/2024 | Mao | G06T 5/70 |
| 12,167,926 B2 * | 12/2024 | Nishii | H04N 23/30 |
| 12,243,127 B2 * | 3/2025 | Lee | G06T 11/005 |
| 2005/0078802 A1 | 4/2005 | Lang et al. | |
| 2011/0206177 A1 | 8/2011 | Hirasawa | |
| 2012/0224760 A1 | 9/2012 | Goshen et al. | |
| 2013/0051516 A1 | 2/2013 | Yang et al. | |
| 2013/0071876 A1 | 3/2013 | Hao et al. | |
| 2015/0342554 A1 | 12/2015 | Mentrup et al. | |
| 2015/0371414 A1 | 12/2015 | Choi et al. | |
| 2017/0065244 A1 | 3/2017 | Taki | |
| 2018/0122094 A1 | 5/2018 | Naito | |
| 2018/0349759 A1 | 12/2018 | Isogawa et al. | |
| 2019/0035058 A1 | 1/2019 | Strobel et al. | |
| 2019/0102621 A1 | 4/2019 | Flohr et al. | |
| 2019/0108441 A1 | 4/2019 | Thibault et al. | |
| 2019/0201106 A1 | 7/2019 | Siemionow et al. | |
| 2019/0325621 A1 | 10/2019 | Wang et al. | |
| 2019/0349759 A1 | 11/2019 | Rosenberg et al. | |
| 2019/0385345 A1 | 12/2019 | Bergner | |
| 2020/0065940 A1 | 2/2020 | Tang et al. | |
| 2020/0241150 A1 | 7/2020 | Ikeda et al. | |
| 2020/0286214 A1 | 9/2020 | Kaneko | |
| 2020/0315566 A1 | 10/2020 | Takagi | |
| 2021/0059629 A1 | 3/2021 | Hamill | |
| 2021/0251583 A1 | 8/2021 | Hamauzu | |
| 2022/0313199 A1 | 10/2022 | Nishii et al. | |
| 2023/0135988 A1 | 5/2023 | Onishi et al. | |
| 2023/0136930 A1 | 5/2023 | Suyama et al. | |

FOREIGN PATENT DOCUMENTS

| | | |
|---|---|---|
| CN | 102577356 B | 11/2014 |
| CN | 106233127 A | 12/2016 |
| CN | 107516330 A | 12/2017 |
| CN | 107533019 A | 1/2018 |
| CN | 107595312 A | 1/2018 |
| CN | 107871332 A | 4/2018 |
| CN | 108139489 A | 6/2018 |
| CN | 109544477 A | 3/2019 |
| CN | 109697476 A | 4/2019 |
| CN | 109805950 A | 5/2019 |
| JP | 2001-099941 A | 4/2001 |
| JP | 2003-167060 A | 6/2003 |
| JP | 2006-318103 A | 11/2006 |
| JP | 2008-229161 A | 10/2008 |
| JP | 2013-512024 A | 4/2013 |
| JP | 2018-117900 A | 9/2018 |
| JP | 2018-206382 A | 12/2018 |
| JP | 6454820 B1 | 1/2019 |
| JP | 2019045235 A | 3/2019 |
| JP | 2019-091393 A | 6/2019 |
| JP | 2019-111322 A | 7/2019 |
| JP | 2019-158663 A | 9/2019 |
| JP | 2019168360 A | 10/2019 |
| JP | 2019-202087 A | 11/2019 |
| JP | 2019-208990 A | 12/2019 |
| JP | 2019-535451 A | 12/2019 |
| JP | 2020-096646 A | 6/2020 |
| JP | 2020-141908 A | 9/2020 |
| TW | 202018431 A | 5/2020 |
| TW | 202113349 A | 4/2021 |
| WO | 2007/114470 A1 | 10/2007 |
| WO | WO-2011/064683 A2 | 6/2011 |
| WO | WO-2013/005805 A1 | 1/2013 |
| WO | 2014/052267 A1 | 4/2014 |
| WO | WO-2018/098077 A1 | 5/2018 |
| WO | WO-2018/104349 A1 | 6/2018 |
| WO | WO-2019/082276 A1 | 5/2019 |
| WO | WO-2019/097796 A1 | 5/2019 |
| WO | WO-2020/031984 A1 | 2/2020 |
| WO | 2021210617 A1 | 10/2021 |
| WO | 2021210618 A1 | 10/2021 |

OTHER PUBLICATIONS

An English translation of JP2018-117900A by Patent Translate (2025).*

An English translation of JP2020096646A by Patent Translate. (2025).*

Kenzo Isogawa et al., "Deep Shrinkage Convolutional Neural Network for Adaptive Noise Reduction", IEEE Signal Processing Letters, vol. 25, No. 2, Feb. 1, 2018, p. 224-p. 228, XP055508221.

Xiao-Ping Zhang et al., "Thresholding Neural Network for Adaptive Noise Reduction", IEEE Transactions on Neural Networks, IEEE Service Center, Piscataway, NJ, US, vol. 12, No. 3, May 1, 2001, p. 567-p. 584, XP011039623.

Sungmin Cha et al, "Fully Convolutional Pixel Adaptive Image Denoiser", arxiv.org, Cornell University Library, 201 Olin Library Cornell University Ithaca, NY 14853, Jul. 19, 2018, p. 1-p. 19, XP081114501.

Yuewen Sun, "Digital radiography image denoising using a generative adversarial network", Journal of X-Ray Science and Technology, vol. 26, No. 4, Aug. 10, 2018, p. 523-p. 534, XP93154123.

International Preliminary Report on Patentability mailed Oct. 27, 2022 for PCT/JP2021/015488.

International Preliminary Report on Patentability mailed Oct. 27, 2022 for PCT/JP2021/015464.

International Preliminary Report on Patentability mailed Oct. 27, 2022 for PCT/JP2021/015489.

English-language translation of International Preliminary Report on Patentability (IPRP) dated Aug. 24, 2023 that issued in WO Patent Application No. JP2021/037173.

Zhang et al, "FFDNet: Toward a Fast and Flexible Solution for CNN based Image Denoising", arxiv.org, Cornell University Library, 201 Olin Library, Cornell University, Ithaca, NY 14853, Oct. 11, 2017, XP081150272.

Abramova et al, "Analysis of Noise Properties in Dental Images", 2020 IEEE 40th International Conference on Electronics and Nanotechnology (ELNANO), Apr. 22, 2020 May 6, 2020, p. 511-p. 515, XP033769133.

Sungmin Cha, et al. "Proceedings of the IEEE/CVF International Conference on Computer Vision (ICCV)", IEEE/CVF, 2019, p. 4160-p. 4169.

Hideki Kato et al., "A Presumption Calculating Formula of the X-ray Spectrum Generated from a Molybdenum Target X-ray Tube", The Journal of the Japan Society of Radiological Technology, Mar. 31, 2011, p. 193-p. 201.

Lu Qiu_hong et al., "Fault detecting technology based on neural netwom: algorithm", Optics and Precision Engineering, Feb. 2002, vol. 10, No. 1, p. 25-p. 30.

Li Wei, "High-resolution X-ray digital radiography of electronic industry", School of Information Engineering, Chang'an University, Xi'an 710064, China, Jul. 2012, vol. 33, No. 4, p. 654-p. 659.

U.S. Appl. No. 18/270,987 office action dated Aug. 21, 2025.

* cited by examiner

RADIOGRAPHIC IMAGE PROCESSING METHOD, TRAINED MODEL, RADIOGRAPHIC IMAGE PROCESSING MODULE, RADIOGRAPHIC IMAGE PROCESSING PROGRAM, AND RADIOGRAPHIC IMAGE PROCESSING SYSTEM

TECHNICAL FIELD

One aspect of an embodiment relates to a radiographic image processing method, a trained model, a radiographic image processing module, a radiographic image processing program, and a radiographic image processing system.

BACKGROUND ART

Since the past, a method of removing noise from image data using a trained model through machine learning such as deep learning has been known (see, for example, the following Patent Literature 1). According to this method, noise from the image data is automatically removed, and thus it is possible to observe a target object with high accuracy.

CITATION LIST

Patent Literature

[Patent Literature 1] Japanese Unexamined Patent Publication No. 2019-91393

SUMMARY OF INVENTION

Technical Problem

In the method of the related art as described above, noise may not be sufficiently removed in a case where a radiographic image generated by transmitting radiation such as X-rays through a target object is used as a target. For example, a relationship between luminance and noise in an image has a tendency to fluctuate depending on the conditions of a radiation source such as an X-ray source, the type of filter being used, and the like, and the noise tends to be difficult to remove effectively.

Consequently, one aspect of an embodiment was contrived in view of such a problem, and an object thereof is to provide a radiographic image processing method, a trained model, a radiographic image processing module, a radiographic image processing program, and a radiographic image processing system that make it possible to effectively remove noise from a radiographic image.

Solution to Problem

According to one aspect of an embodiment, there is provided a radiographic image processing method including: a step of acquiring a radiographic image of a jig using a system that radiates radiation to a target object and captures an image of the radiation passing through the target object to acquire a radiographic image; a step of specifying image characteristics of the radiographic image of the jig; a step of selecting a trained model on the basis of the image characteristics from a plurality of trained models constructed through machine learning in advance using image data; a step of acquiring a radiographic image of the target object using the system; and a step of executing image processing for removing noise from the radiographic image of the target object using the selected trained model.

Alternatively, according to another aspect of the embodiment, there is provided a trained model used for the above radiographic image processing method, wherein the trained model is constructed through machine learning using image data and causes a processor to execute image processing for removing noise from a radiographic image of the target object.

Alternatively, according to another aspect of the embodiment, there is provided a radiographic image processing module including: an acquisition unit configured to acquire radiographic images of a jig and a target object using a system that radiates radiation to the target object and captures an image of the radiation passing through the target object to acquire a radiographic image; a specification unit configured to specify image characteristics of the radiographic image of the jig; a selection unit configured to select a trained model on the basis of the image characteristics from a plurality of trained models constructed through machine learning in advance using image data; and a processing unit configured to execute image processing for removing noise from the radiographic image of the target object using the selected trained model.

Alternatively, according to another aspect of the embodiment, there is provided a radiographic image processing program causing a processor to function as: an acquisition unit configured to acquire radiographic images of a jig and a target object using a system that radiates radiation to the target object and captures an image of the radiation passing through the target object to acquire a radiographic image; a specification unit configured to specify image characteristics of the radiographic image of the jig; a selection unit configured to select a trained model on the basis of the image characteristics from a plurality of trained models constructed through machine learning in advance using image data; and a processing unit configured to execute image processing for removing noise from the radiographic image of the target object using the selected trained model.

Alternatively, according to another aspect of the embodiment, there is provided a radiographic image processing system including: the above radiographic image processing module; a source configured to radiate radiation to the target object; and an imaging device configured to capture an image of the radiation passing through the target object and acquire the radiographic image.

According to the one aspect or the other aspects, the image characteristics of the radiographic image of the jig are specified, and the trained model used for noise removal is selected from the trained models constructed in advance on the basis of the image characteristics. Thereby, since the characteristics of the radiographic image changing depending on the conditions and the like of the radiation source in the system can be estimated, and the trained model selected in accordance with the estimation result is used for noise removal, it is possible to realize noise removal corresponding to the relationship between luminance and noise in the radiographic image. As a result, it is possible to effectively remove noise from the radiographic image.

Advantageous Effects of Invention

According to the embodiment, it is possible to effectively remove noise from a radiographic image of a target object.

DESCRIPTION OF EMBODIMENTS

Hereinafter, embodiments of the present invention will be described in detail with reference to the accompanying drawings. Meanwhile, in the description, the same elements or elements having the same function are denoted by the same reference signs, and thus duplicate description will be omitted.

Figure 1:
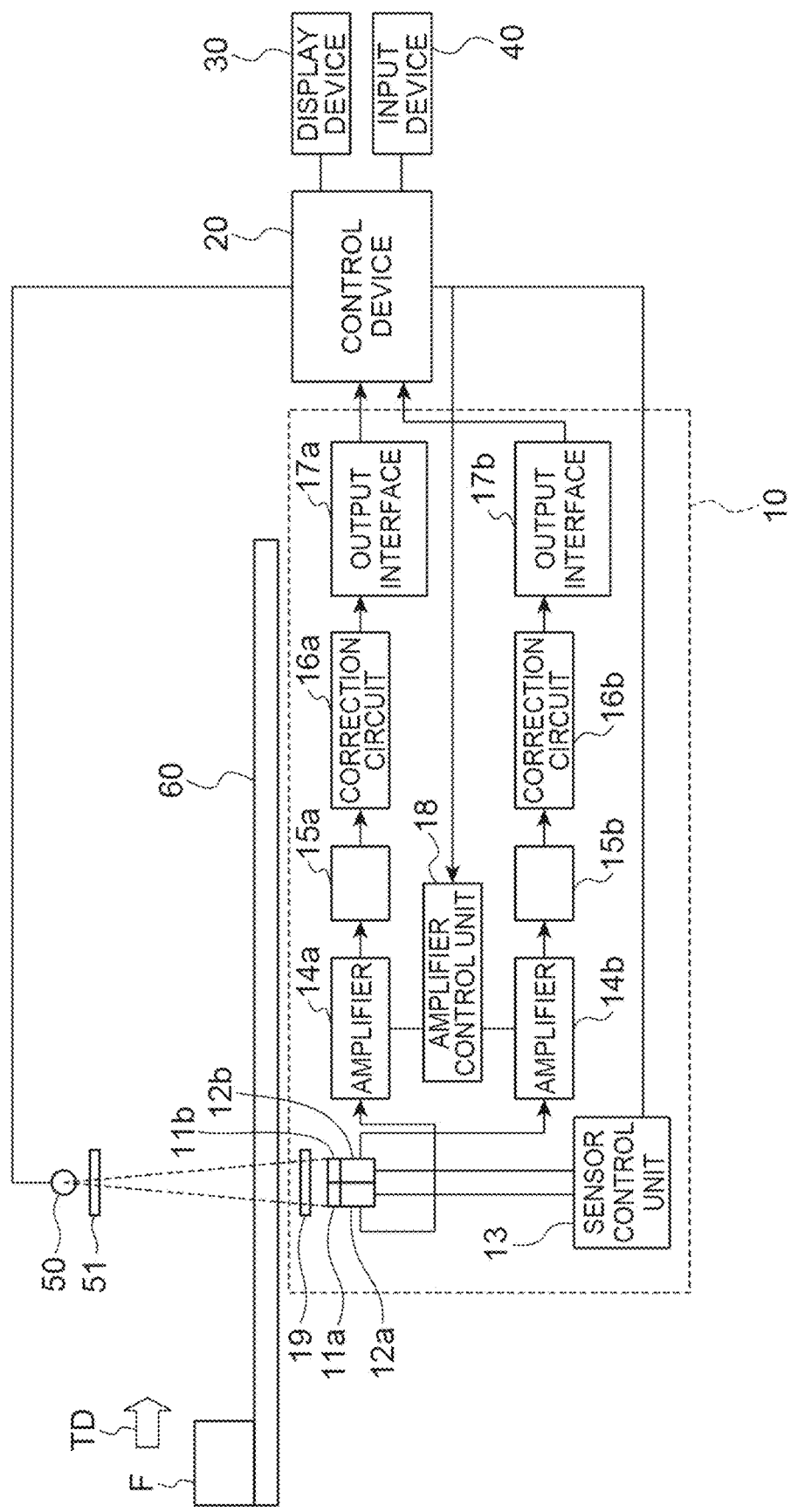
FIG. 1 is a schematic configuration diagram of an image acquisition device 1 according to an embodiment.

FIG. 1 is a configuration diagram of an image acquisition device 1 which is a radiographic image processing system according to the present embodiment. As shown in FIG. 1, the image acquisition device 1 is a device that radiates X-rays (radiation) to a target object F which is transported in a transport direction TD and acquires an X-ray transmission image (radiographic image) obtained by capturing an image of the target object F on the basis of the X-rays passing through the target object F. The image acquisition device 1 performs a foreign substance inspection, a weight inspection, a product inspection, or the like on the target object F using an X-ray transmission image, and examples of the application include food inspection, baggage inspection, substrate inspection, battery inspection, material inspection, and the like. The image acquisition device 1 is configured to include a belt conveyor (transport means) 60, an X-ray irradiator (radiation source) 50, an X-ray detection camera (imaging device) 10, a control device (radiographic image processing module) 20, a display device 30, and an input device 40 for performing various inputs. Meanwhile, the radiographic image in the embodiment of the present invention is not limited to an X-ray image, and may also be an image caused by electromagnetic radiation other than X-rays such as γ-rays.

The belt conveyor 60 has a belt portion on which the target object F is placed, and transports the target object F in the transport direction TD at a predetermined transport speed by moving the belt portion in the transport direction TD. The transport speed of the target object F is, for example, 48 m/min. The belt conveyor 60 can change the transport speed as necessary to a transport speed such as, for example, 24 m/min or 96 m/min. In addition, the belt conveyor 60 can appropriately change the height position of the belt portion to change a distance between the X-ray irradiator 50 and the target object F. Meanwhile, examples of the target object F transported by the belt conveyor 60 include foodstuffs such as meat, seafood, agricultural products, or confectionery, rubber products such as tires, resin products, metal products, resource materials such as minerals, waste, and various products such as electronic parts or electronic substrates. The X-ray irradiator 50 is a device that radiates (outputs) X-rays to the target object F as an X-ray source. The X-ray irradiator 50 is a point light source, and diffuses and radiates the X-rays in a predetermined angle range in a fixed irradiation direction. The X-ray irradiator 50 is disposed above the belt conveyor 60 at a predetermined distance from the belt conveyor 60 so that the irradiation direction of the X-rays is directed toward the belt conveyor 60 and the diffused X-rays extend in the entire width direction of the target object F (a direction intersecting the transport direction TD). In addition, the X-ray irradiator 50 is configured such that, in the lengthwise direction of the target object F (a direction parallel to the transport direction TD), a predetermined division range in the lengthwise direction is set as an irradiation range, and the X-rays are radiated in the entire lengthwise direction of the target object F by the target object F being transported in the transport direction TD by the belt conveyor 60. The X-ray irradiator 50 has a tube voltage and a tube current set by the control device 20, and radiates X-rays having predetermined energy and a radiation dose according to the set tube voltage and tube current toward the belt conveyor 60. In addition, a filter 51 that transmits a predetermined wavelength region of the X-rays is provided in the vicinity of the X-ray irradiator 50 on the belt conveyor 60 side. The filter 51 is not necessarily required and may not be present.

The X-ray detection camera 10 detects X-rays passing through the target object F among the X-rays radiated to the target object F by the X-ray irradiator 50, and outputs a signal based on the X-rays. The X-ray detection camera 10 is a dual-line X-ray camera in which two sets of configurations for detecting X-rays are disposed. In the image acquisition device 1 according to the present embodiment, each X-ray transmission image is generated on the basis of the X-rays detected in each line (a first line and a second line) of the dual-line X-ray camera. By performing average processing, addition processing, or the like on the two generated X-ray transmission images, a clear (high-luminance) image can be acquired with a smaller X-ray dose than in a case where an X-ray transmission image is generated on the basis of the X-rays detected in one line.

The X-ray detection camera 10 includes a filter 19, scintillators 11a and 11b, line scan cameras 12a and 12b, a sensor control unit 13, amplifiers 14a and 14b, AD converters 15a and 15b, correction circuits 16a and 16b, output interfaces 17a and 17b, and an amplifier control unit 18. The scintillator 11a, the line scan camera 12a, the amplifier 14a, the AD converter 15a, the correction circuit 16a, and the output interface 17a are electrically connected to each other, and have components related to the first line. In addition, the scintillator 11b, the line scan camera 12b, the amplifier 14b, the AD converter 15b, the correction circuit 16b, and the output interface 17b are electrically connected to each other, and have components related to the second line. The line scan camera 12a of the first line and the line scan camera 12b of the second line are disposed side by side in the transport direction TD. Meanwhile, hereinafter, the components of the first line will be described to represent components common to the first line and the second line.

The scintillator 11a is fixed on the line scan camera 12a by adhesion or the like, and converts the X-rays passing through the target object F into scintillation light. The scintillator 11a outputs the scintillation light to the line scan camera 12a. The filter 19 transmits a predetermined wavelength region of the X-rays toward the scintillator 11a. The filter 19 is not necessarily required and may not be present.

The line scan camera 12a detects the scintillation light from the scintillator 11a, converts the detected light into electric charge, and outputs it as a detection signal (electrical signal) to the amplifier 14a. The line scan camera 12a has a plurality of line sensors arranged in parallel in a direction intersecting the transport direction TD. The line sensor is, for example, a charge coupled device (CCD) image sensor, a complementary metal-oxide semiconductor (CMOS) image sensor, or the like, and includes a plurality of photodiodes.

The sensor control unit 13 controls the line scan cameras 12a and 12b to repeatedly capture images at a predetermined detection period so that the line scan cameras 12a and 12b can capture an image of X-rays passing through the same region of the target object F. As the predetermined detection period, for example, a period common to the line scan cameras 12a and 12b may be set on the basis of the distance between the line scan cameras 12a and 12b, the speed of the belt conveyor 60, the distance between the X-ray irradiator 50 and the target object F on the belt conveyor 60 (focus object distance (FOD)), and the distance between the X-ray irradiator 50 and the line scan cameras 12a and 12b (focus detector distance (FDD)). In addition, the predetermined period may be individually set on the basis of the pixel width of a photodiode in a direction perpendicular to the arrangement direction of pixels of the line sensors of the line scan cameras 12a and 12b. In this case, the deviation (delay time) of the detection period between the line scan cameras 12a and 12b may be specified in accordance with the distance between the line scan cameras 12a and 12b, the speed of the belt conveyor 60, the distance between the X-ray irradiator 50 and the target object F on the belt conveyor 60 (FOD), and the distance between the X-ray irradiator 50 and the line scan cameras 12a and 12b (FDD), and individual periods may be set for each. The amplifier 14a amplifies the detection signal at a predetermined set amplification factor to generate an amplified signal, and outputs the amplified signal to the AD converter 15a. The set amplification factor is an amplification factor which is set by the amplifier control unit 18. The amplifier control unit 18 sets the set amplification factor of the amplifiers 14a and 14b on the basis of predetermined imaging conditions.

The AD converter 15a converts the amplified signal (voltage signal) output by the amplifier 14a into a digital signal, and outputs the converted signal to the correction circuit 16a. The correction circuit 16a performs a predetermined correction such as signal amplification on the digital signal, and outputs the corrected digital signal to the output interface 17a. The output interface 17a outputs the digital signal to the outside of the X-ray detection camera 10. In FIG. 1, the AD converter, the correction circuit, and the output interface exist individually, but they may be integrated into one.

The control device 20 is a computer such as, for example, a personal computer (PC). The control device 20 generates an X-ray transmission image on the basis of the digital signal (amplified signal) output from the X-ray detection camera 10 (more specifically, the output interfaces 17a and 17b). The control device 20 generates one X-ray transmission image by performing average processing or addition processing on two digital signals output from the output interfaces 17a and 17b. The generated X-ray transmission image is output to the display device 30 after a noise removal process to be described later is performed, and is displayed by the display device 30. In addition, the control device 20 controls the X-ray irradiator 50, the amplifier control unit 18, and the sensor control unit 13. Meanwhile, the control device 20 of the present embodiment is a device which is independently provided outside the X-ray detection camera 10, but it may be integrated inside the X-ray detection camera 10.

Figure 2:
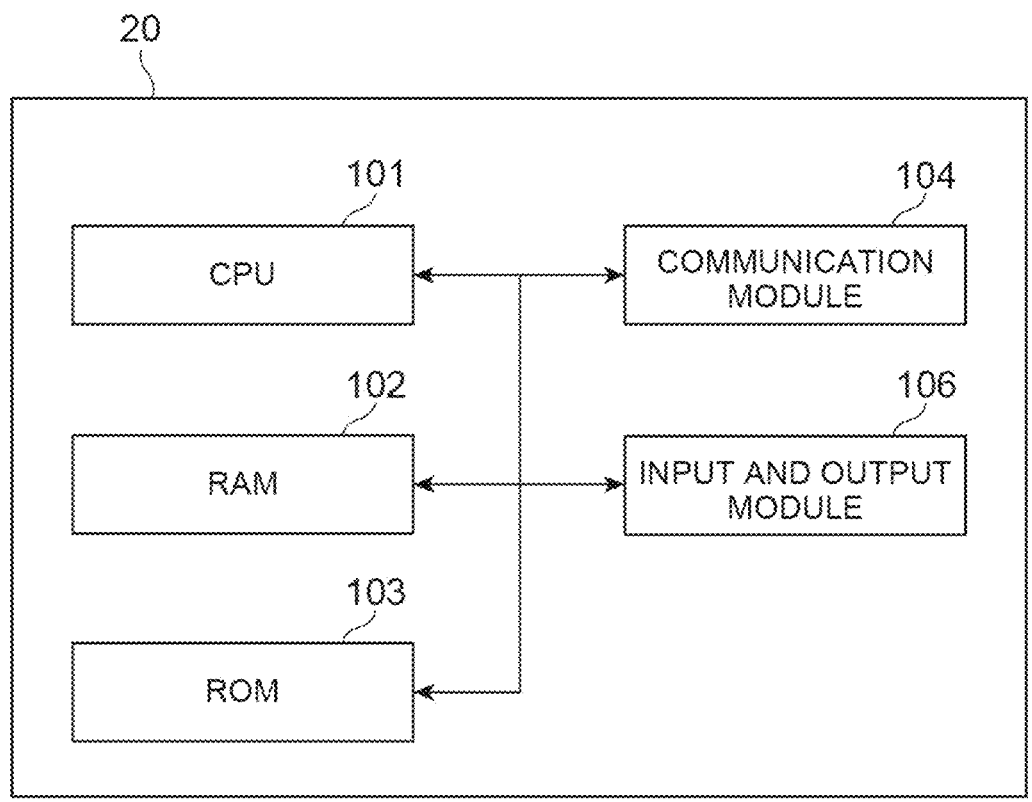
FIG. 2 is a block diagram illustrating an example of a hardware configuration of a control device 20 of FIG. 1.

FIG. 2 shows a hardware configuration of the control device 20. As shown in FIG. 2, the control device 20 is a computer or the like physically including a central processing unit (CPU) 101 which is a processor, a random access memory (RAM) 102 or a read only memory (ROM) 103 which is a recording medium, a communication module 104, an input and output module 106, and the like, which are electrically connected to each other. Meanwhile, the control device 20 may include a display, a keyboard, a mouse, a touch panel display, and the like as the input device 40 and the display device 30, or may include a data recording device such as a hard disk drive or a semiconductor memory. In addition, the control device 20 may be constituted by a plurality of computers.

Figure 3:
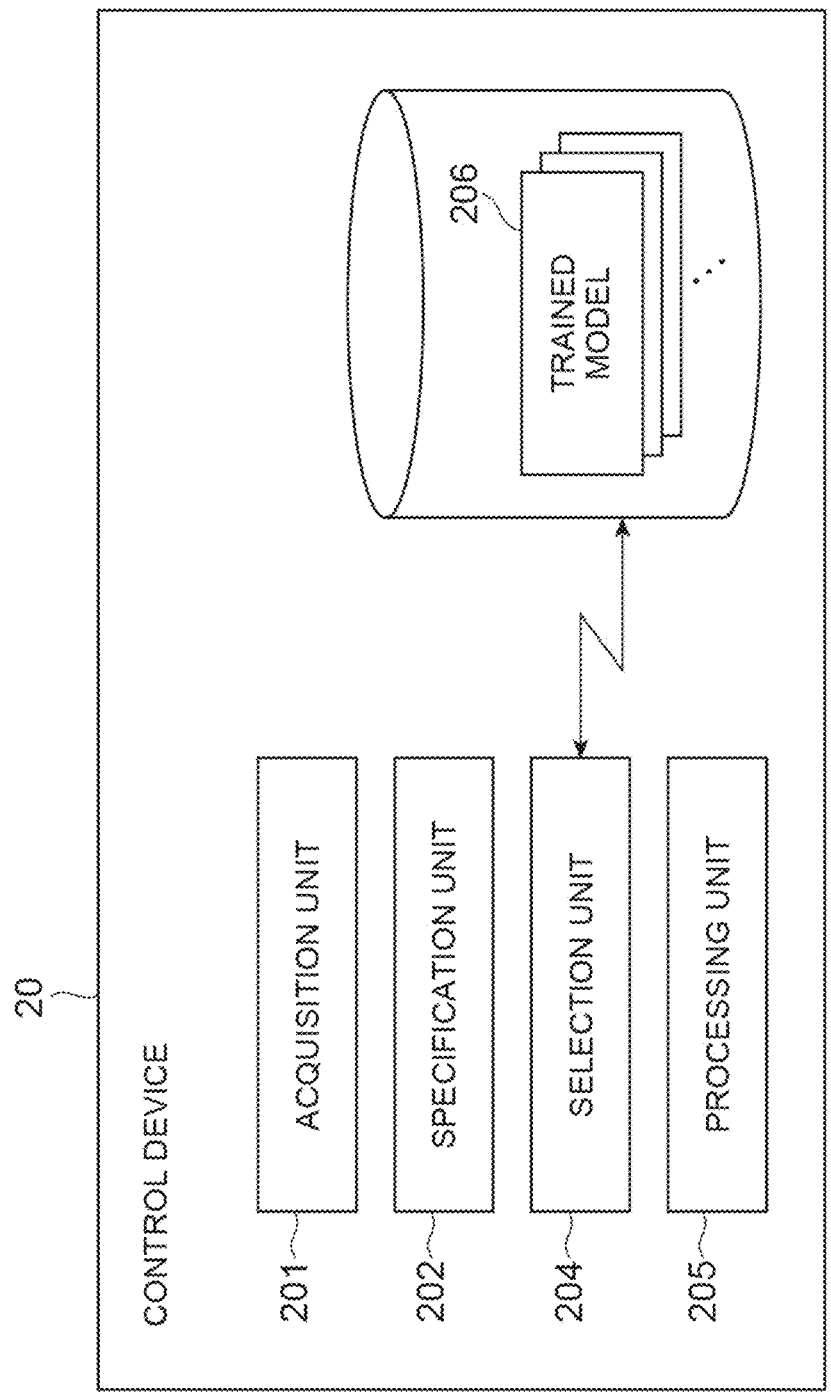
FIG. 3 is a block diagram illustrating a functional configuration of the control device 20 of FIG. 1.

FIG. 3 is a block diagram illustrating a functional configuration of the control device 20. The control device 20 includes an acquisition unit 201, a specification unit 202, a selection unit 204, and a processing unit 205. Each functional unit of the control device 20 shown in FIG. 3 is realized by loading a program (a radiographic image processing program of the present embodiment) on the hardware such as the CPU 101 and the RAM 102 to thereby bring the communication module 104, the input and output module 106, and the like into operation under the control of the CPU 101 and read out and write data in the RAM 102. The CPU 101 of the control device 20 causes the control device 20 to function as each functional unit in FIG. 3 by executing this computer program, and sequentially executes processing corresponding to a radiographic image processing method to be described later. Meanwhile, the CPU may be a single piece of hardware, or may be implemented in a programmable logic such as an FPGA like a soft processor. The RAM or the ROM may also be a single piece of hardware, or may be built into a programmable logic such as an FPGA. Various types of data required for executing this computer program and various types of data generated by executing this computer program are all stored in a built-in memory such as the ROM 103 or the RAM 102, or a storage medium such as a hard disk drive.

In addition, a plurality of trained models 206 which are loaded by the CPU 101 to cause the CPU 101 to execute a noise removal process for an X-ray transmission image are stored in advance in the control device 20. Each of the plurality of trained models 206 is a learning model based on machine learning constructed in advance using image data as training data. Examples of machine learning include supervised learning, deep learning, reinforcement learning, neural network learning, and the like. In the present embodiment, the two-dimensional convolutional neural network described in the paper "Beyond a Gaussian Denoiser: Residual Learning of Deep CNN for Image Denoising" authored by Kai Zhang et al. is adopted as an example of a deep learning algorithm. The plurality of trained models 206 may be generated by an external computer or the like and downloaded to the control device 20, or may be generated in the control device 20.

Figure 4:
FIG. 4 is a diagram illustrating an example of image data which is training data used to construct trained models 206 of FIG. 3.

FIG. 4 shows an example of image data which is training data used to construct trained models 206. As the training data, an X-ray transmission image having a pattern of various thicknesses, various materials, and various resolutions as an imaging target can be used. The example shown in FIG. 4 is an example of an X-ray transmission image generated for chicken. As the image data, an X-ray transmission image actually generated for a plurality of types of target objects using the image acquisition device 1 may be used, or image data generated by simulation calculation may be used. The X-ray transmission image may be acquired using a device different from the image acquisition device 1. In addition, the X-ray transmission image and the image data generated by simulation calculation may be used in combination. Each of the plurality of trained models 206 is constructed in advance using image data obtained for transmitted X-rays having different average energy and having a known noise distribution. The average energy of X-rays in the image data is set to a different value in advance by setting the operating conditions of the X-ray irradiator (radiation source) 50 of the image acquisition device 1, the imaging conditions of the image acquisition device 1, or the like, or setting the operating conditions or imaging conditions of the X-ray irradiator 50 during simulation calculation. That is, the plurality of trained models 206 are constructed through machine learning using, as training data, a training image which is an X-ray image corresponding to average energy related to X-rays passing through the target object F calculated on the basis of condition information indicating the operating conditions of the X-ray irradiator (radiation source) 50 when the X-ray transmission image of the target object F is captured, the imaging conditions of the X-ray detection camera 10, or the like (construction step). For example, in the present embodiment, each of the plurality of trained models 206 is constructed using multiple frames (for example, 20,000 frames) of a plurality of types of image data in which the average energy is 10 keV, 20 keV, 30 keV, . . . and values in increments of 10 keV are set.

Figure 5:
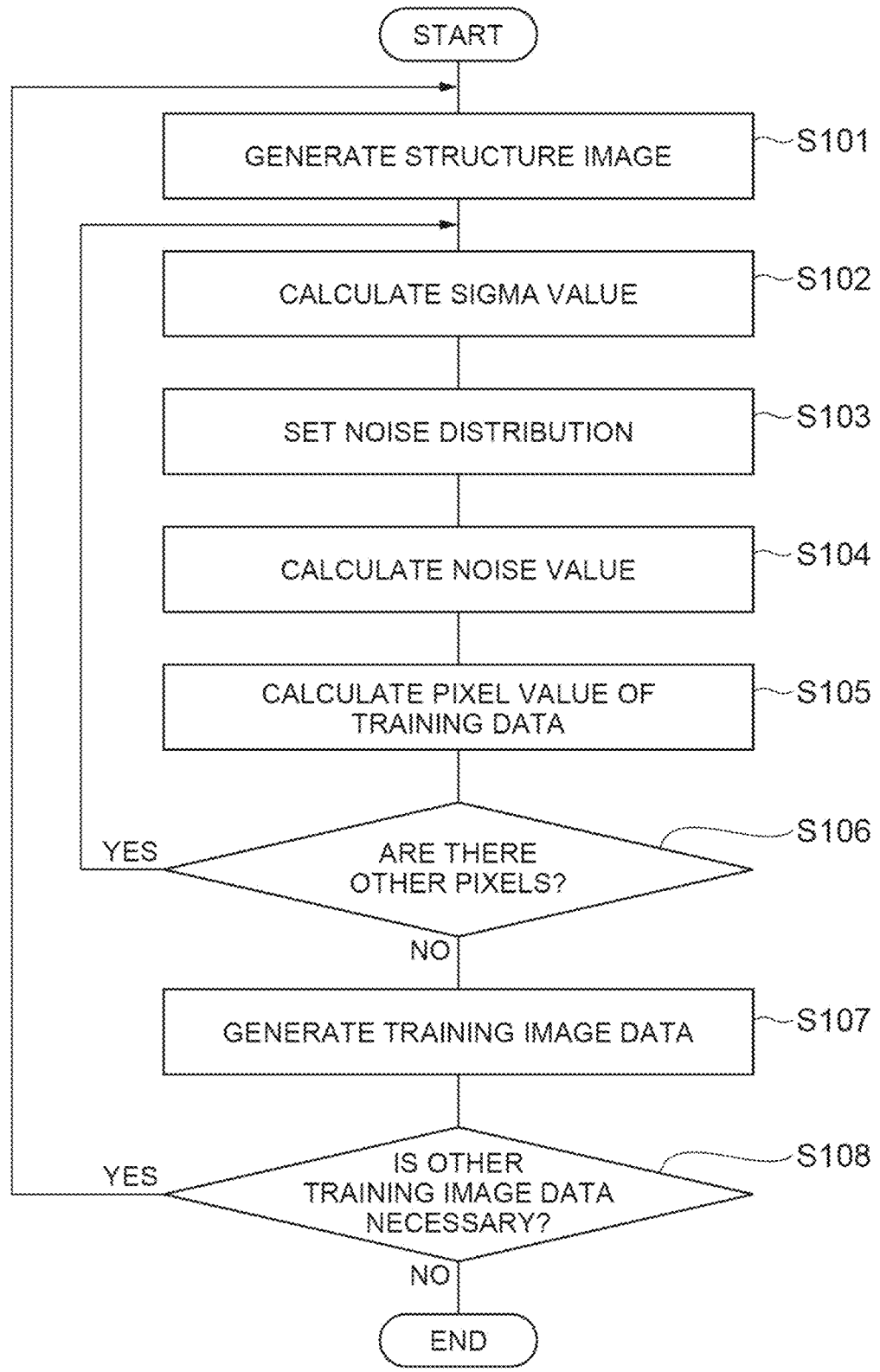
FIG. 5 is a flowchart illustrating a procedure of creating image data which is training data used to construct the trained models 206 of FIG. 3.

FIG. 5 is a flowchart illustrating a procedure of creating image data which is training data used to construct the trained models 206.

The image data (also referred to as training image data) which is training data is created by a computer in the following procedure. First, an image of a structural body having a predetermined structure (structure image) is created (step S101). For example, an image of a structural body having a predetermined structure may be created by simulation calculation. In addition, an X-ray image of a structure such as a chart having a predetermined structure may be acquired to create a structure image. Next, a sigma value which is a standard deviation of pixel values is calculated for one pixel selected from a plurality of pixels constituting such a structure image (step S102). A normal distribution (Poisson distribution) indicating a noise distribution is then set on the basis of the sigma value obtained in step S102 (step S103). In this manner, training data for various noise conditions can be generated by setting the normal distribution on the basis of the sigma value. Subsequently, a noise value which is set at random is calculated along the normal distribution which is set on the basis of the sigma value in step S103 (step S104). Further, the noise value obtained in step S104 is added to the pixel value of one pixel to generate pixel values constituting the image data which is training data (step S105). The processes of steps S102 to S105 are performed for each of a plurality of pixels constituting the structure image (step S106), and training image data serving as training data is generated (step S107). In addition, in a case where the training image data is further required, it is determined that the processes of steps S101 to S107 are performed on another structure image (step S108), and another training image data serving as training data is generated. Meanwhile, the other structure image may be an image of a structural body having the same structure, or may be an image of a structural body having another structure.

Meanwhile, it is necessary to prepare a large number of pieces of image data which is training data used to construct the trained model 206. In addition, the structure image is preferably an image with less noise, ideally an image without noise. Therefore, when a structure image is generated through simulation calculation, many images without noise can be generated, and thus it is effective to generate a structure image through simulation calculation.

Hereinafter, referring back to FIG. 3, the details of the function of each functional unit of the control device 20 will be described.

The acquisition unit 201 acquires an X-ray transmission image captured by radiating X-rays to a jig and the target object F using the image acquisition device 1. As the jig, a flat plate-like member whose thickness and material are known and in which a relationship between the average energy of X-rays and the transmittance of X-rays is known, or a jig having a chart whose image is captured at various resolutions is used. That is, the acquisition unit 201 acquires an X-ray transmission image of the jig captured by using the image acquisition device 1 in advance of the observation processing of the target object F. The acquisition unit 201 acquires an X-ray transmission image of the target object F captured by using the image acquisition device 1 at a timing after the trained model 206 is selected on the basis of the X-ray transmission image of the jig. However, the acquisition timings of the X-ray transmission images of the jig and the target object F are not limited to the above, and may be simultaneous or reverse timings.

The specification unit 202 specifies the image characteristics of the X-ray transmission image of the jig acquired by the acquisition unit 201. Specifically, the selection unit 204 specifies energy characteristics, noise characteristics, resolution characteristics, frequency characteristics, or the like as the image characteristics of the X-ray transmission image.

For example, in a case where a flat plate-like member whose thickness and material is known is used as a jig, the specification unit 202 compares the luminance of the X-ray image passing through the jig with the luminance of the X-ray image passing through the air, and calculates the transmittance of X-rays at one point (or the average transmittance of a plurality of points) in the jig. For example, in a case where the luminance of the X-ray image passing through the jig is 5,550 and the luminance of the X-ray image passing through the air is 15,000, the transmittance is calculated to be 37%. The specification unit 202 then specifies the average energy (for example, 50 keV) of transmitted X-rays estimated from the transmittance of 37% as the energy characteristics of the X-ray transmission image of the jig.

Figure 6:
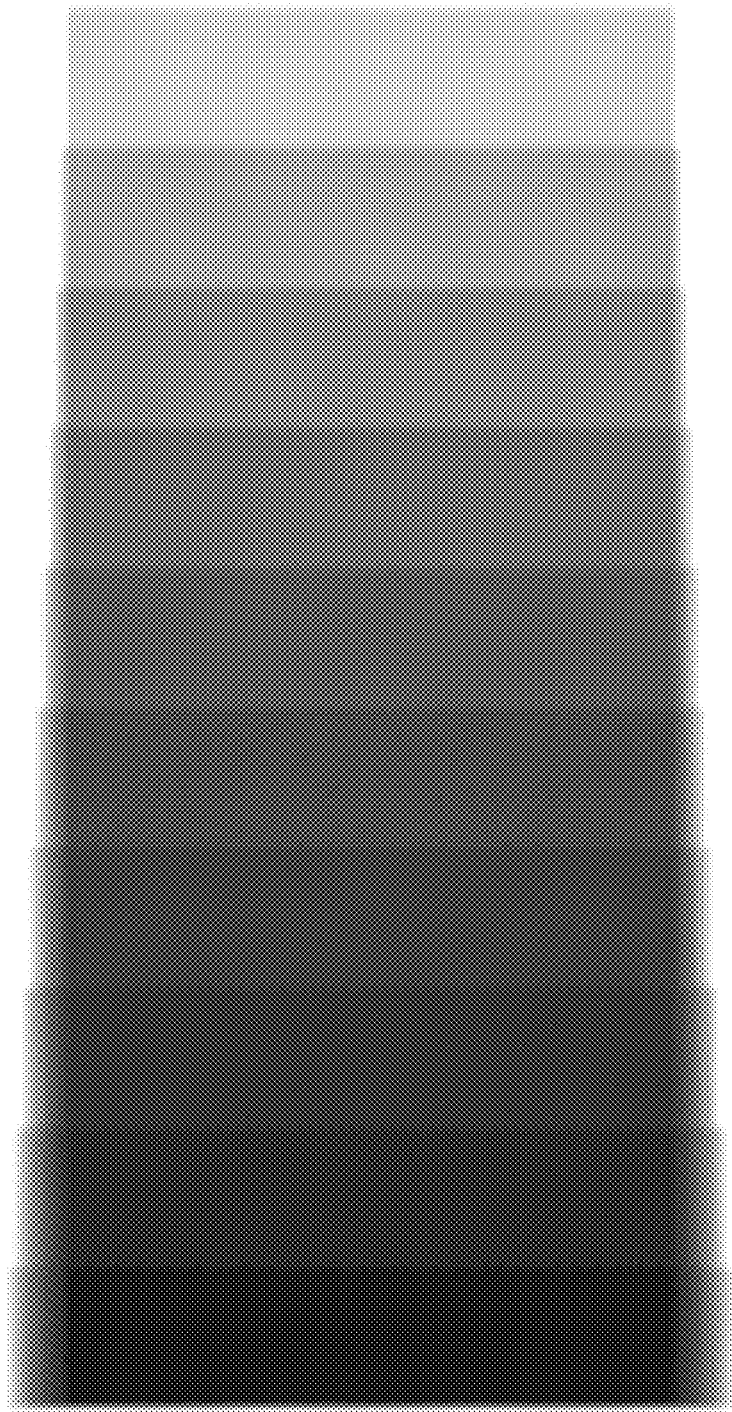
FIG. 6 is a diagram illustrating an example of an X-ray transmission image to be analyzed by a specification unit 202 of FIG. 3.
Figure 7:
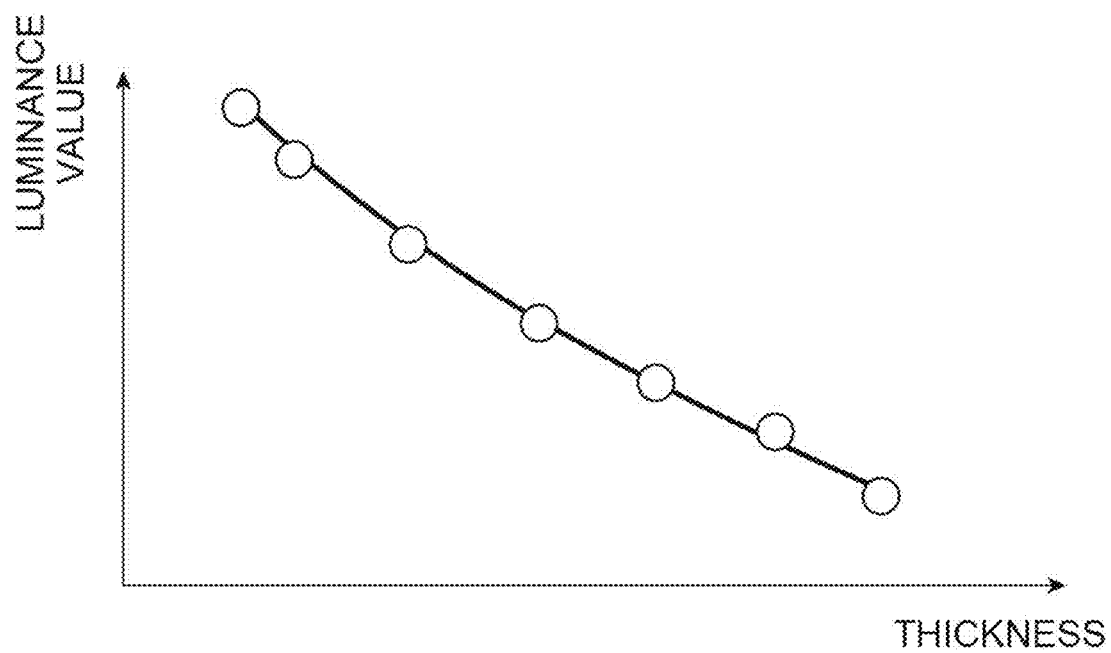
FIG. 7 is a diagram illustrating an example of a characteristic graph of thickness and luminance acquired by the specification unit 202 of FIG. 3.

In addition, the specification unit 202 may analyze the characteristics at a plurality of points of the jig whose thickness or material changes as the energy characteristics of the X-ray transmission image of the jig. FIG. 6 is a diagram illustrating an example of an X-ray transmission image to be analyzed by the specification unit 202. FIG. 6 is an X-ray transmission image for a jig having a shape in which the thickness changes stepwise. The specification unit 202 selects a plurality of measurement regions (regions of interest (ROI)) having different thicknesses from such an X-ray transmission image, analyzes the luminance average value for each of the plurality of measurement regions, and acquires a characteristic graph of thickness and luminance as energy characteristics. FIG. 7 shows an example of a characteristic graph of thickness and luminance acquired by the specification unit 202.

Figure 8:
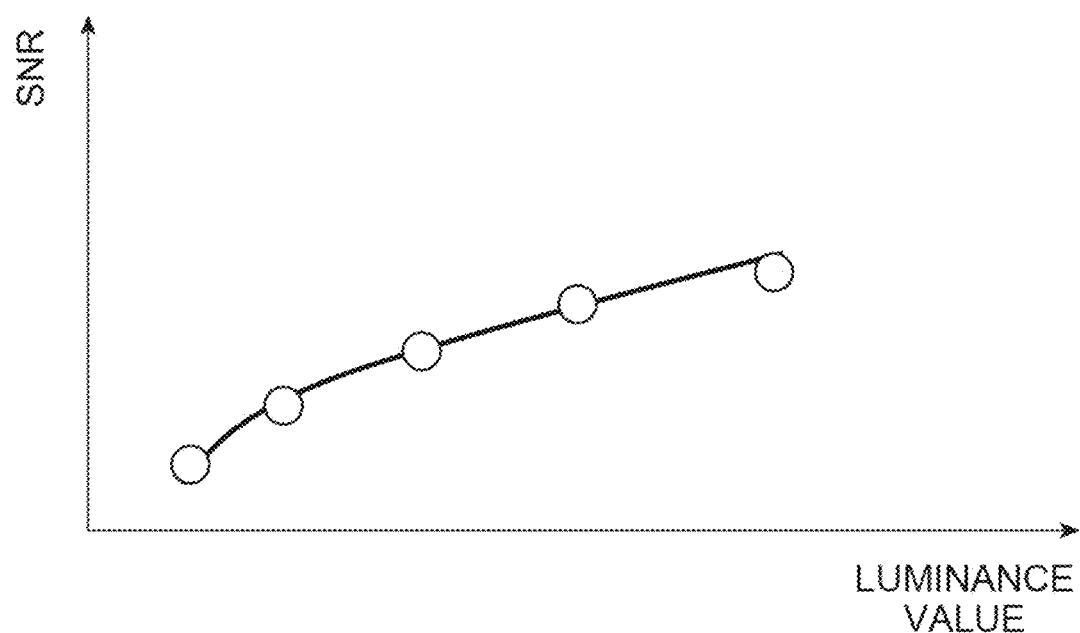
FIG. 8 is a diagram illustrating an example of a characteristic graph of luminance and SNR acquired by the specification unit 202 of FIG. 3.

In addition, the specification unit 202 can also analyze the luminance value and noise for each of the plurality of measurement regions as the noise characteristics of the X-ray transmission image of the jig, and acquire a characteristic graph of a luminance to noise ratio as the noise characteristics. That is, the specification unit 202 selects a plurality of measurement regions ROI having different thicknesses or materials from the X-ray transmission image, analyzes the standard deviation of the luminance values of the plurality of measurement regions ROI and the average value of the luminance values thereof, and acquires a characteristic graph of luminance and a SN ratio (SNR) as the noise characteristics. In this case, the specification unit 202 calculates the SNR for each measurement region ROI using SNR=(average value of luminance values)÷(standard deviation of luminance values). FIG. 8 shows an example of a characteristic graph of luminance and SNR acquired by the specification unit 202. Here, the specification unit 202 may acquire a characteristic graph in which the vertical axis is a noise calculated from the standard deviation of the luminance values, as the noise characteristics, instead of the above characteristic graph of luminance and SNR.

Figure 9:
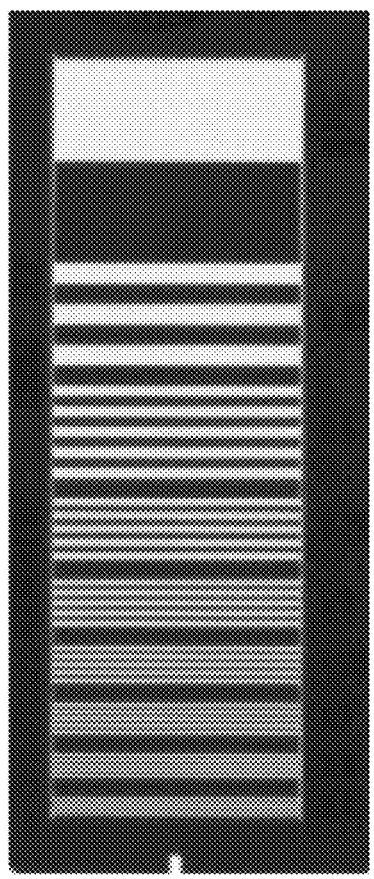
FIG. 9 is a diagram illustrating an example of an X-ray transmission image used for the evaluation of resolution in the specification unit 202 of FIG. 3.

In addition, in a case where a jig having a chart is used, the specification unit 202 can also acquire the distribution of resolutions in the X-ray transmission image of the jig as the resolution characteristics. Further, the specification unit 202 has also a function of acquiring the resolution characteristics of an image after the noise removal process is performed by applying a plurality of trained models 206 to the X-ray transmission image of the jig. FIG. 9 shows an example of an X-ray transmission image used for the evaluation of resolution. In this X-ray transmission image, a chart whose resolution changes stepwise in one direction is used as an imaging target. The resolution of the X-ray transmission image can be measured using a modulation transfer function (MTF) or a contrast transfer function (CTF).

Referring back to FIG. 3, the selection unit 204 finally selects trained models 206 to be used for the noise removal process of the X-ray transmission image of the target object F from the plurality of trained models 206 stored in the control device 20 on the basis of the image characteristics acquired by the specification unit 202. That is, the selection unit 204 compares the image characteristics specified by the specification unit 202 with the image characteristics specified from the image data used to construct the plurality of trained models 206, and selects a trained model 206 in which both are similar to each other.

For example, the selection unit 204 selects one trained model 206 constructed by the image data of average energy closest to the value of the average energy of the transmitted X-rays specified by the specification unit 202.

In addition, the selection unit 204 acquires a characteristic graph of thickness and luminance for the image data used to construct the plurality of trained models 206 in the same manner as the method of specification performed by the specification unit 202, and selects trained models 206 constructed by image data having characteristics closest to the characteristic graph of thickness and luminance acquired for the jig as final trained models 206. However, the image characteristics of the image data used to construct the trained models 206 may be referred to those calculated in advance outside the control device 20. By using the image characteristics obtained by setting a plurality of measurement regions in this way, it is possible to select the best trained model for noise removal of the X-ray transmission image of the target object F. Particularly, it is possible to accurately estimate a difference in the X-ray spectrum or a difference in the effect of the filter during measurement of the X-ray transmission image.

In addition, the selection unit 204 may select trained models 206 constructed by image data having the characteristics of the luminance to noise ratio closest to the characteristics of the luminance to noise ratio acquired by the specification unit 202 as the final trained models 206. However, the image characteristics of the image data used to construct the trained models 206 may be acquired by the selection unit 204 from the image data, or may be referred to those calculated in advance outside the control device 20. Here, the selection unit 204 may select the trained model 206 using the characteristics of luminance and noise, as the noise characteristics, instead of the characteristics of the luminance to noise ratio. By using such characteristics of luminance and noise, it is possible to specify a dominant noise factor (such as shot noise or readout noise) from the slope of the graph in the region of each signal amount with respect to each signal amount detected by the X-ray detection camera 10, and to select trained models 206 on the basis of the specification result.

Figure 10:
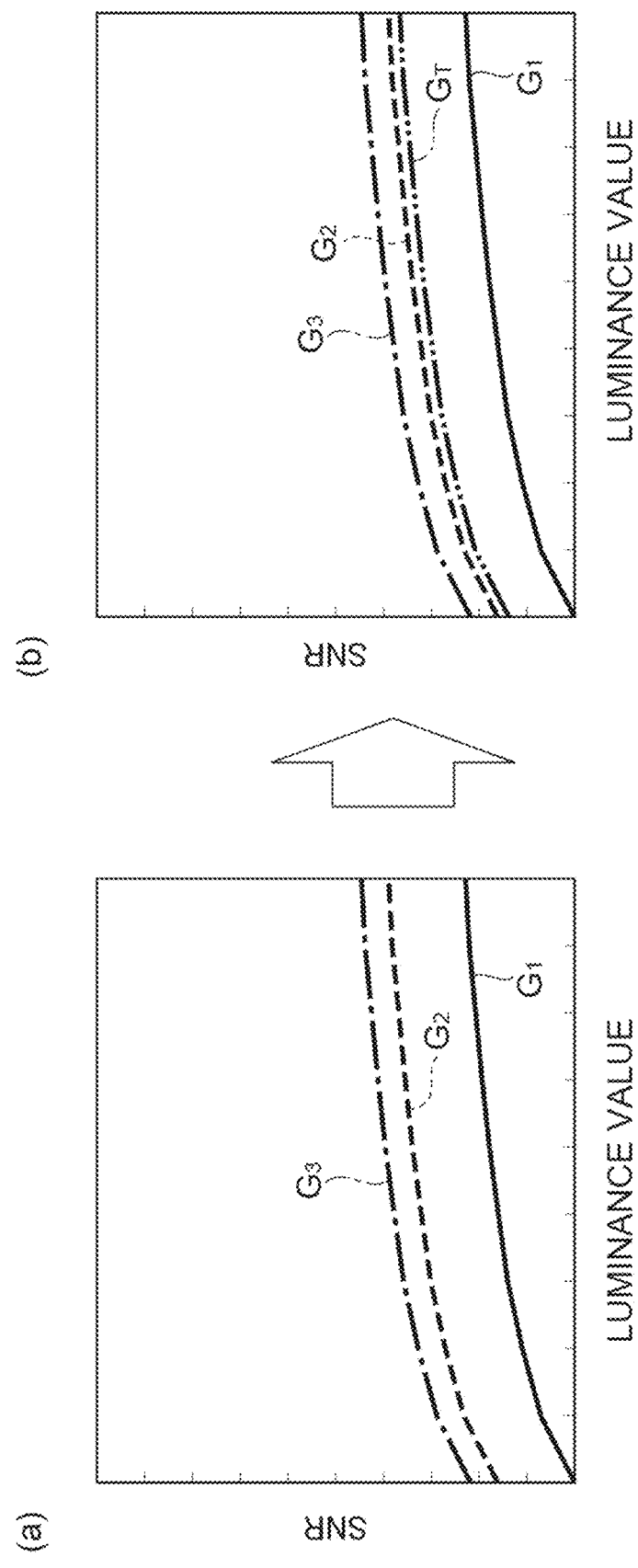
FIG. 10 is a diagram illustrating a function of selection of a trained model based on image characteristics which is performed by a selection unit 204 of FIG. 3.

FIG. 10 is a diagram illustrating a function of selection of a trained model based on image characteristics which is performed by the selection unit 204. In FIG. 10, the part (a) shows characteristic graphs $G_1$, $G_2$, and $G_3$ of luminance and SNR of image data used to construct the plurality of trained models 206, and the part (b) shows a characteristic graph $G_T$ of luminance and SNR of the X-ray transmission image obtained by capturing an image of the jig in addition to these characteristic graphs $G_1$, $G_2$, and $G_3$. In a case where such characteristic graphs $G_1$, $G_2$, $G_3$, and $G_T$ are targeted, the selection unit 204 functions so as to select trained models 206 constructed by image data of the characteristic graph $G_2$ closest to the characteristics of the characteristic graph $G_T$. At the time of selection, the selection unit 204 calculates an SNR error for each luminance value at regular intervals between each of the characteristic graphs $G_1$, $G_2$, and $G_3$ and the characteristic graph $G_T$, calculates the root mean squared error (RMSE) of these errors, and selects trained models 206 corresponding to the characteristic graphs $G_1$, $G_2$, and $G_3$ having the smallest root mean squared error. In addition, even in a case where the selection is performed using the energy characteristics, the selection unit 204 can select trained models 206 in the same way.

The selection unit 204 can also select trained models 206 used to generate an image having relatively excellent characteristics on the basis of the characteristics of an image after a plurality of trained models are applied to the X-ray transmission image of the jig and the noise removal process is executed.

For example, the selection unit 204 uses the X-ray transmission image obtained by capturing an image of the jig having charts of various resolutions to apply a plurality of trained models 206 to the image and evaluate the resolution characteristics of the resulting image after noise removal. The selection unit 204 then selects trained model 206 used for an image having the smallest change in the resolution of each distribution before and after the noise removal process.

Figure 11:
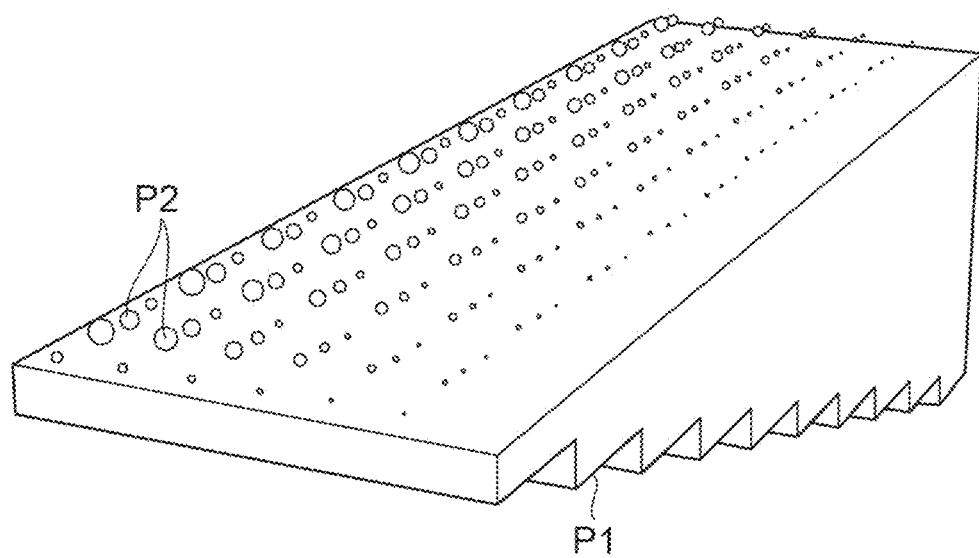
FIG. 11 is a perspective view illustrating an example of a structure of a jig used for the evaluation of a luminance to noise ratio which is performed by the selection unit 204 of FIG. 3.
Figure 12:
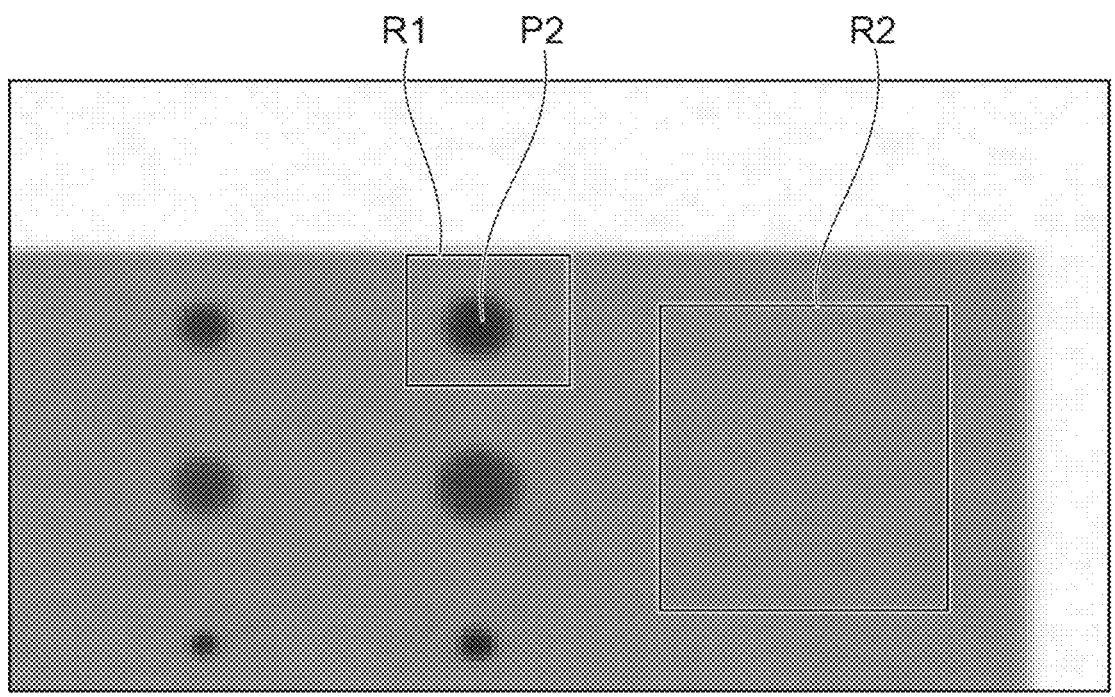
FIG. 12 is a diagram illustrating an X-ray transmission image after a noise removal process obtained for the jig of FIG. 11.

In addition to the evaluation of the above change in resolution, the selection unit 204 may evaluate the characteristics of the luminance to noise ratio of the image after noise removal and select trained model 206 used to generate an image having the highest characteristics. FIG. 11 shows an example of the structure of the jig used for the evaluation of the luminance to noise ratio. For example, as the jig, a jig in which foreign substances P2 having various materials and various sizes are scattered in a member P1 whose thickness changes stepwise in one direction can be used. FIG. 12 shows an X-ray transmission image obtained for the jig of FIG. 11 after the noise removal process. The selection unit 204 selects an image region R1 containing an image of the foreign substance P2 in the X-ray transmission image and an image region R2 not containing an image of the foreign substance P2 in the vicinity of the region R1, and calculates the minimum value $L_{MIN}$ of luminance in the image region R1, the average value $L_{AVE}$ of luminance in the image region R2, and the standard deviation $L_{SD}$ of luminance in the image region R2. The selection unit 204 calculates the luminance to noise ratio CNR using the following expression.

$$CNR=(L_{AVE}-L_{MIN})/L_{SD}$$

Further, the selection unit 204 calculates the luminance to noise ratio CNR for each of the X-ray transmission images after the application of the plurality of trained models 206, and selects trained models 206 used to generate an X-ray transmission image having the highest luminance to noise ratio CNR.

Alternatively, the selection unit 204 may perform the calculation using the following expression on the basis of the average value $L_{AVE\_R1}$ of luminance in the image region R1, the average value $L_{AVE\_R2}$ of luminance in the image region R2, and the standard deviation $L_{SD}$ of luminance in the image region R2.

$$CNR=(L_{AVE\_R1}-L_{MIN\_R2})/L_{SD}$$

The processing unit 205 applies the trained models 206 selected by the selection unit 204 to the X-ray transmission image acquired for the target object F, and generates an output image by executing image processing for removing noise. The processing unit 205 then outputs the generated output image to the display device 30 or the like.

Figure 13:
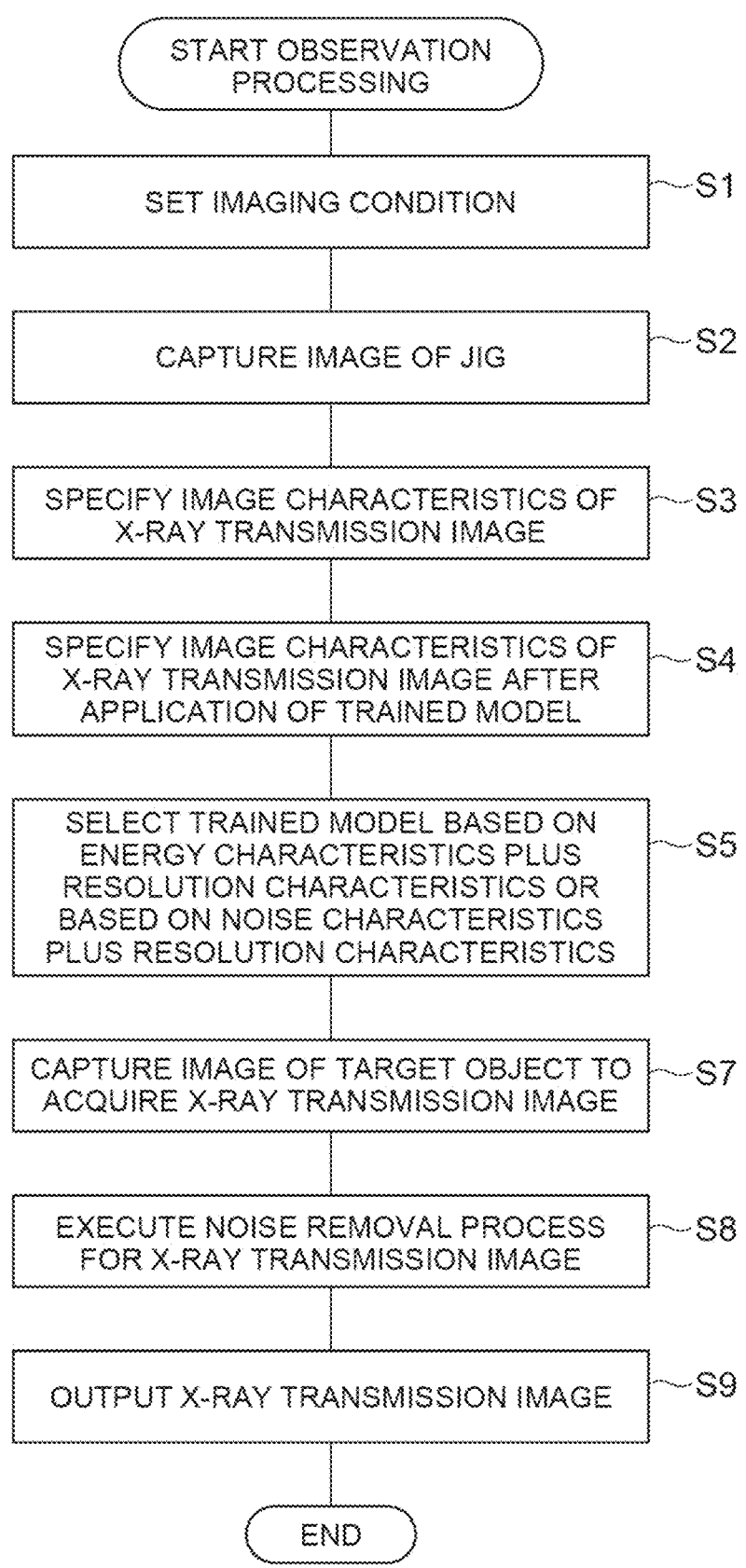
FIG. 13 is a flowchart illustrating a procedure of observation processing using the image acquisition device 1.

Next, a procedure of observing the X-ray transmission image of the target object F using the image acquisition device 1 according to the present embodiment, that is, a flow of the radiographic image processing method according to the present embodiment will be described. FIG. 13 is a flowchart illustrating a procedure of observation processing using the image acquisition device 1.

First, an operator (user) of the image acquisition device 1 sets the imaging conditions in the image acquisition device 1 such as the tube voltage of the X-ray irradiator 50 or the gain in the X-ray detection camera 10 (step S1). Next, a jig is set in the image acquisition device 1, and the control device 20 acquires an X-ray transmission image for the jig (step S2). In this case, X-ray transmission images of a plurality of types of jigs may be sequentially acquired.

Accordingly, the control device 20 specifies the image characteristics (energy characteristics, noise characteristics, and resolution characteristics) of the X-ray transmission image of the jig (step S3). Further, the control device 20 applies a plurality of trained models 206 to the X-ray transmission image of the jig, and specifies the image characteristics (such as the resolution characteristics or the value of the luminance to noise ratio) of each X-ray transmission image after the application of the plurality of trained models 206 (step S4).

Next, the control device 20 selects trained model 206 on the basis of the result of comparison between the energy characteristics of the X-ray transmission image of the jig and the energy characteristics of the image data used to construct the trained model 206, and the degree of change in the resolution characteristics of the X-ray transmission image of the jig before and after the application of the trained model (step S5). Here, the trained model 206 may be selected on the basis of the result of comparison between the noise characteristics of the X-ray transmission image of the jig and the noise characteristics of the image data used to construct trained model 206, and the state of change in the resolution characteristics of the X-ray transmission image of the jig before and after the application of the trained model. In addition, in step S5, a trained model 206 having the highest luminance to noise ratio CNR after the application of the trained model of the X-ray transmission image of the jig may be selected instead of the above process.

Further, in the image acquisition device 1, the target object F is set to capture an image of the target object F, and thus an X-ray transmission image of the target object F is acquired (step S7). Next, the control device 20 applies the finally selected trained model 206 to the X-ray transmission image of the target object F, and thus the noise removal process is executed for the X-ray transmission image (step S8). Finally, the control device 20 outputs an output image which is an X-ray transmission image that has undergone the noise removal process to the display device 30 (step S9).

According to the image acquisition device 1 described above, the image characteristics of the X-ray transmission image of the jig are specified, and a trained model used for noise removal is selected from the trained models constructed in advance on the basis of the image characteristics. Thereby, since the characteristics of the X-ray transmission image changing depending on the operating conditions and the like of the X-ray irradiator 50 in the image acquisition device 1 can be estimated, and the trained model 206 selected in accordance with the estimation result is used for noise removal, it is possible to realize noise removal corresponding to the relationship between luminance and noise in the X-ray transmission image. As a result, it is possible to effectively remove noise from the X-ray transmission image.

Generally, an X-ray transmission image contains noise derived from the generation of X-rays. It is also conceivable to increase the X-ray dose in order to improve the SN ratio of the X-ray transmission image. However, in that case, there is a problem in that increasing the X-ray dose increases the exposure of a sensor, shortens the life of the sensor, and shortens the life of the X-ray source, and thus it is difficult to achieve both an improvement in the SN ratio and an increase in life. In the present embodiment, it is not necessary to increase the X-ray dose, and thus it is possible to achieve both an improvement in the SN ratio and an increase in life.

In the present embodiment, in the selection of the trained model, the image characteristics of the X-ray transmission image of the jig and the image characteristics of the image data used to construct the trained model are compared with each other. Thereby, since the trained model 206 constructed by the image data corresponding to the image characteristics of the X-ray transmission image of the jig is selected, it is possible to effectively remove noise from the X-ray transmission image of the target object F.

In addition, in the present embodiment, the trained model is selected using the image characteristics of an image in which a plurality of trained models 206 are applied to the X-ray transmission image of the jig. In this case, since the trained model 206 is selected on the basis of the image characteristics of the X-ray transmission image of the jig to which a plurality of trained models 206 are actually applied, it is possible to effectively remove noise from the X-ray transmission image of the target object F.

Particularly, in the present embodiment, energy characteristics or noise characteristics are used as the image characteristics. In this case, the trained model 206 constructed by an image having characteristics similar to the energy characteristics or noise characteristics of the X-ray transmission image of the jig changing depending on the imaging conditions of the image acquisition device 1 is selected. As a result, it is possible to remove noise from the X-ray transmission image of the target object F corresponding to a change in the conditions of the image acquisition device 1.

In the present embodiment, resolution characteristics or luminance to noise ratio are also used as the image characteristics. According to such a configuration, the selected trained model 206 is applied, and thus it is possible to obtain an X-ray transmission image having good resolution characteristics or luminance to noise ratio. As a result, it is possible to remove noise from the X-ray transmission image of the target object corresponding to a change in the conditions of the image acquisition device 1.

Figure 14:
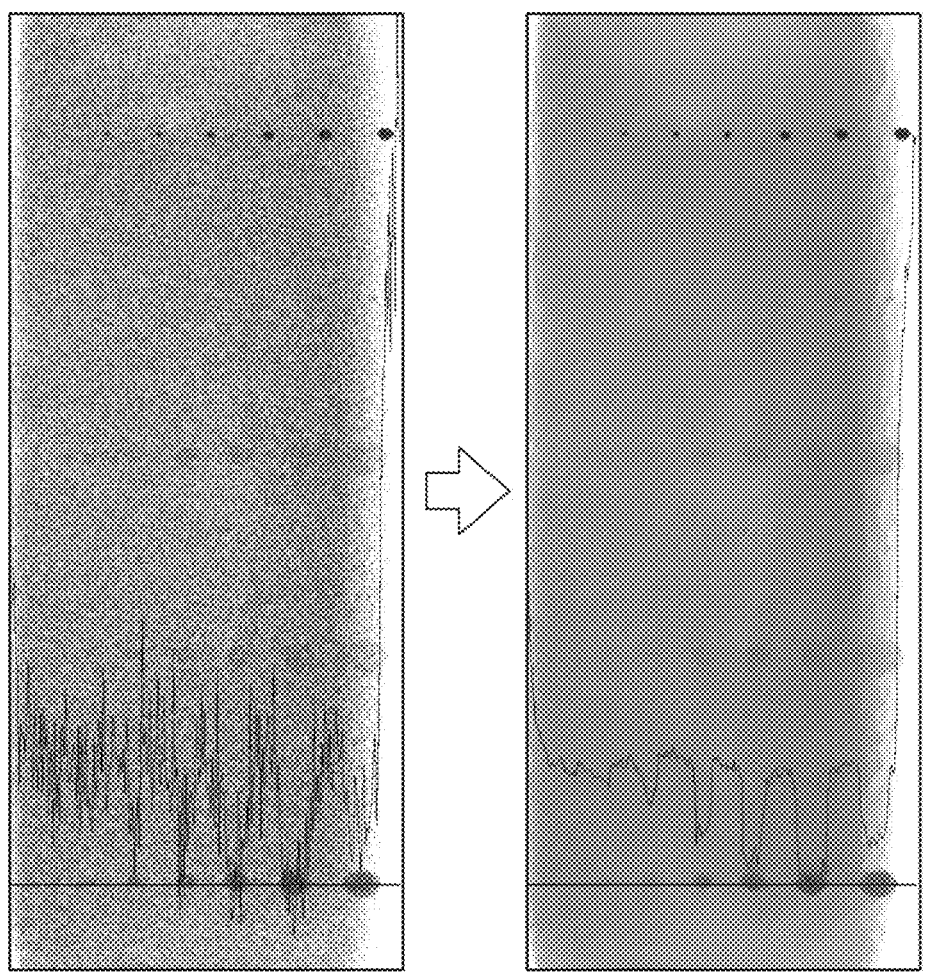
FIG. 14 is a diagram illustrating an example of an X-ray transmission image acquired by the image acquisition device 1 before and after the noise removal process.
Figure 15:
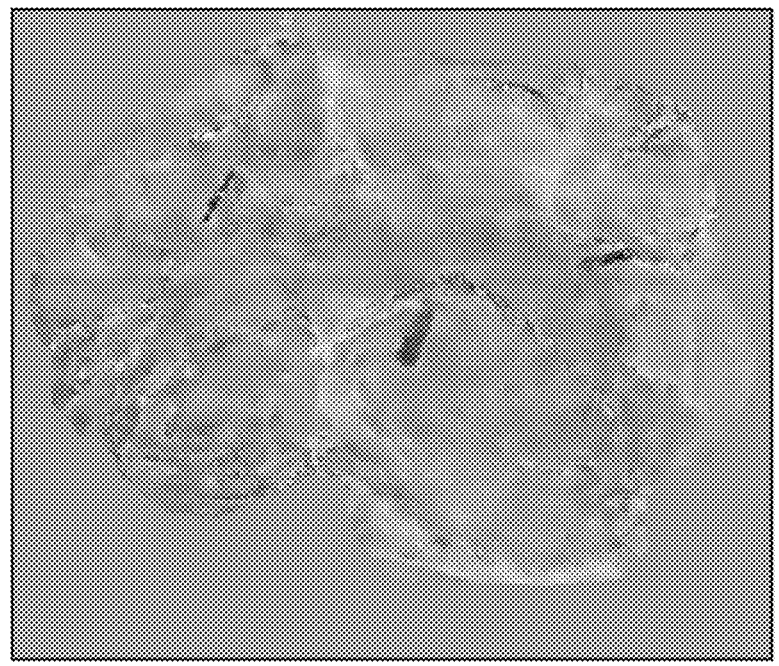
FIG. 15 is a diagram illustrating an example of an X-ray transmission image acquired by the image acquisition device 1 before and after the noise removal process.
Figure 15:
Figure 15:
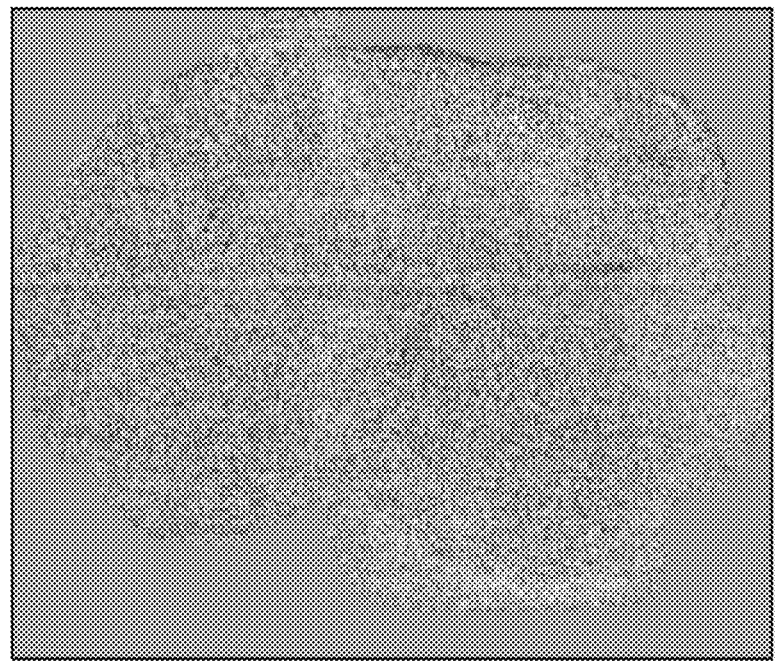

FIGS. 14 and 15 show examples of X-ray transmission images acquired by the image acquisition device 1 before and after the noise removal process. FIGS. 14 and 15 show an image of cheese to which foreign substances such as metal or glass are added and an image of chicken in which bones of various sizes remain, respectively, and show an image before noise processing on the left side and an image after noise processing on the right side, respectively. In this manner, according to the present embodiment, it can be understood that noise removal is effectively performed on various target objects.

Hereinbefore, although various embodiments of the present invention have been described, the present invention is not limited to the above embodiments, and may be modified or applied to others without changing the gist described in each claim.

For example, although the X-ray detection camera 10 has been described as a dual-line X-ray camera, the camera is not limited thereto, and may be a single line X-ray camera, a dual energy X-ray camera, a time delay integration (TDI) scan X-ray camera, a multi-line X-ray camera having a plurality of two or more lines, a two-dimensional X-ray camera, an X-rays flat panel sensor, an X-rays II, a direct conversion type X-ray camera (a-Se, Si, CdTe, CdZnTe, T1Br, PbI2, or the like) that does not uses a scintillator, or an observation type camera using an optical lens with a scintillator based on lens coupling. In addition, the X-ray detection camera 10 may be a camera tube sensitive to radiation or a point sensor sensitive to radiation.

In addition, the image acquisition device 1 is not also limited to the above embodiment, and may be a radiographic image processing system such as a computed tomography (CT) device that captured an image of the target object F in a stationary state. Further, the image acquisition device may be a radiographic image processing system that captures an image of the target object F while rotating the target object.

Figure 16:
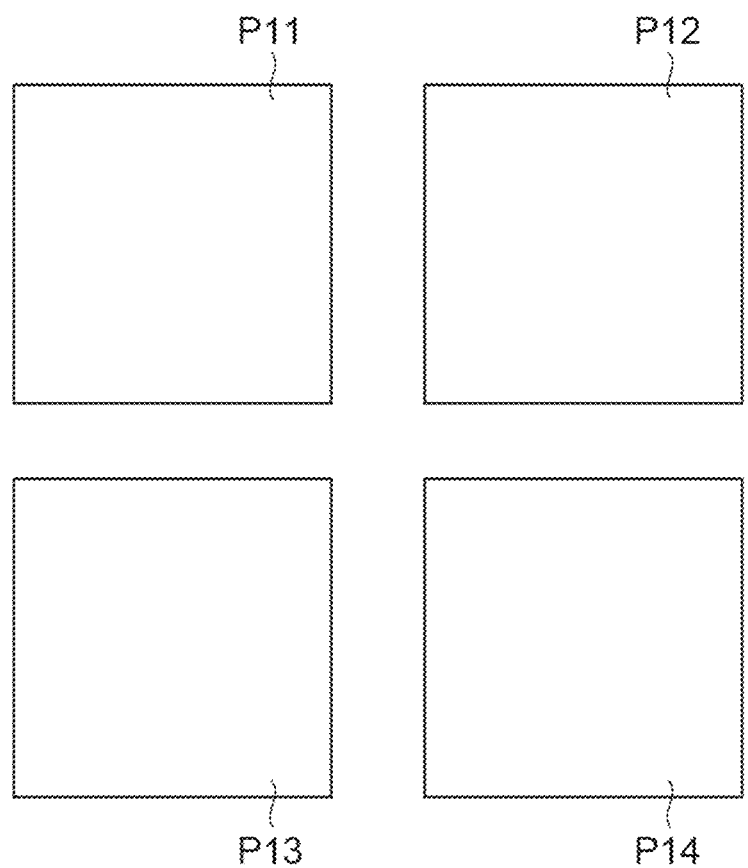
FIG. 16 is a plan view illustrating a form of a jig used in the image acquisition device 1.
Figure 17:
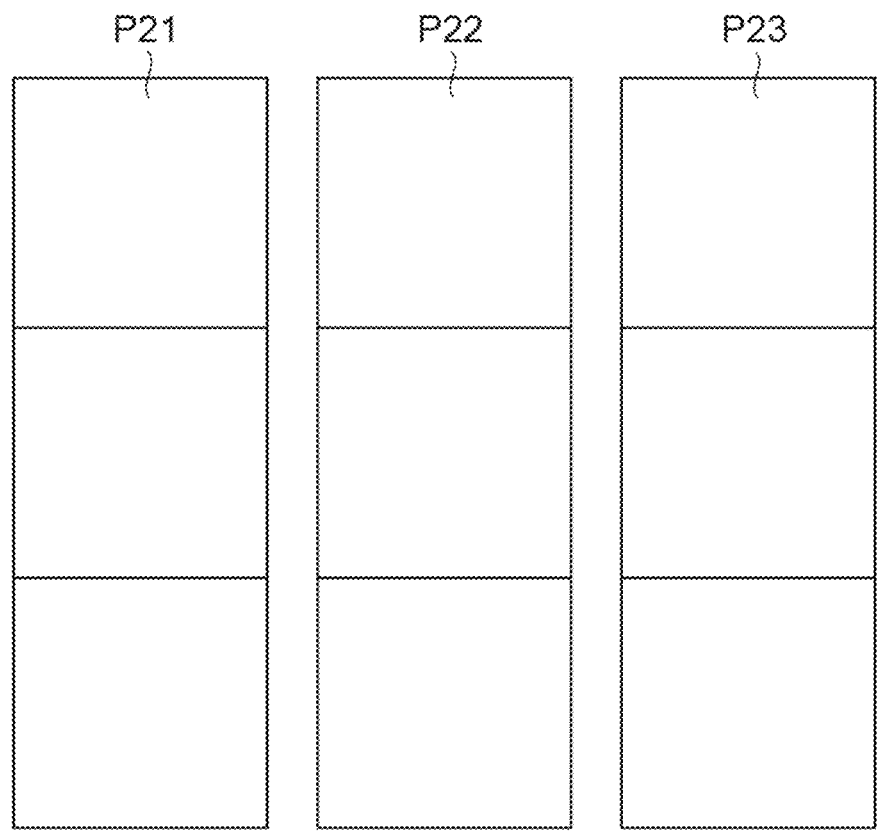
FIG. 17 is a plan view illustrating a form of the jig used in the image acquisition device 1.
Figure 18:
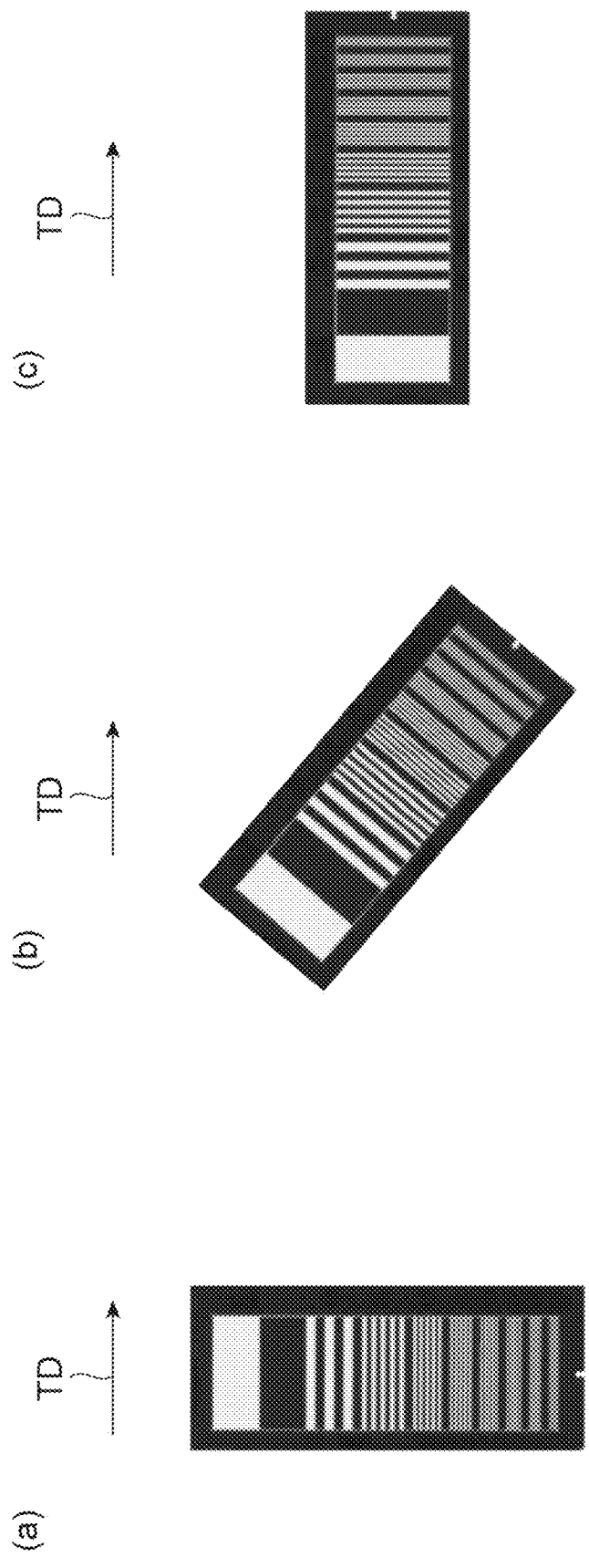
FIG. 18 is a plan view illustrating a form of the jig used in the image acquisition device 1.

In addition, in the image acquisition device 1 of the above embodiment, various types of jigs can be used. For example, as shown in FIG. 16, a jig in which flat plate-like members P11, P12, P13, and P14 made of different materials are arranged two-dimensionally may be used. In addition, as shown in FIG. 17, a form in which members having a shape whose thickness changes one-dimensionally stepwise, that is, flat plate-like members P21, P22, and P23 whose materials are different from each other are arranged side by side may be used. A portion of a jig may have an opening or cut shape so that the target object F or that similar to the target object F can be imaged during capture of an image of the jig. The target object F may be imaged during capture of an image of the jig, and a trained model may be selected by combining a transmitted image of the target object with a transmitted image of the jig. In addition, as shown in the parts (a) to (c) of FIG. 18, a jig having a chart disposed so that the boundary line faces in a parallel direction, a diagonal direction, or a vertical direction with respect to the transport direction TD of the belt conveyor 60 may be used.

In the above-described embodiment, it is preferable that the step of selecting includes selecting the trained model by comparing the image characteristics with image characteristics specified from the image data. In the above embodiment, it is preferable that the selection unit selects the trained model by comparing the image characteristics with image characteristics specified from the image data. Thereby, since the trained model constructed by the image data corresponding to the image characteristics of the radiographic image of the jig is selected, it is possible to effectively remove noise from the radiographic image of the target object.

In addition, it is preferable that the step of specifying includes specifying image characteristics of a plurality of images obtained as a result of applying the plurality of trained models to the radiographic image of the jig, and that the step of selecting includes selecting the trained model on the basis of the image characteristics of the plurality of images. In addition, it is also preferable that the specification unit specifies image characteristics of a plurality of images obtained as a result of applying the plurality of trained models to the radiographic image of the jig, and that the selection unit selects the trained model on the basis of the image characteristics of the plurality of images. In this case, since the trained model is selected on the basis of the image characteristics of the radiographic image of the jig to which a plurality of trained models are actually applied, it is possible to effectively remove noise from the radiographic image of the target object.

Further, it is preferable that the image characteristics are at least one of energy characteristics, noise characteristics, and frequency characteristics, and that the step of selecting includes selecting the trained model constructed by image data image characteristics of which are similar to the image characteristics. Further, it is preferable that the image characteristics are at least one of energy characteristics, noise characteristics, and frequency characteristics, and that the selection unit selects the trained model constructed by image data image characteristics of which are similar to the image characteristics. In this case, the trained model constructed by an image having characteristics similar to at least one of the energy characteristics, noise characteristics, and frequency characteristics of the radiographic image of the jig changing depending on the system is selected. As a result, it is possible to remove noise from the radiographic image of the target object corresponding to a change in the conditions of the system.

In addition, it is also preferable that the image characteristics are resolution characteristics or a luminance to noise ratio, and that the step of selecting further includes selecting the trained model used to generate an image having relatively excellent resolution characteristics or luminance to noise ratio. In addition, it is also preferable that the image characteristics are resolution characteristics or a luminance to noise ratio, and that the selection unit selects the trained model used to generate an image having relatively excellent resolution characteristics or luminance to noise ratio. According to such a configuration, the selected trained model is applied, and thus it is possible to obtain a radiographic image having good resolution characteristics or luminance to noise ratio. As a result, it is possible to remove noise from the radiographic image of the target object corresponding to a change in the conditions of the system.

The embodiment uses a radiographic image processing method, a trained model, a radiographic image processing module, a radiographic image processing program, and a radiographic image processing system, thereby allowing noise in a radiographic image to be effectively removed.

REFERENCE SIGNS LIST

10 X-ray detection camera (imaging device)
20 Control device (radiographic image processing module)
201 Acquisition unit
202 Specification unit
204 Selection unit
205 Processing unit
206 Trained model
F Target object
TD Transport direction

The invention claimed is:

1. A radiographic image processing method comprising:
acquiring a radiographic image of a jig, the radiographic image of the jig is acquired by using a system that radiates radiation to a target object and captures an image of the radiation passing through the target object;
specifying image characteristics of the radiographic image of the jig;
selecting a trained model on a basis of the image characteristics of the radiographic image of the jig from a plurality of trained models, each of the plurality of trained models, constructed using image data of one or more training images, through a machine training in advance;
acquiring a radiographic image of the target object using the system; and
executing an image processing for removing noise from the radiographic image of the target object using the selected trained model.

2. The radiographic image processing method according to claim 1, wherein selecting of the trained model includes selecting the trained model by comparing the image characteristics of the radiographic image of the jig with image characteristics specified from the image data of the one or more training images used to construct the plurality of trained models.

3. The radiographic image processing method according to claim 2, wherein the image characteristics of the radiographic image of the jig are at least one of energy characteristics, noise characteristics, and frequency characteristics, and
selecting of the trained model includes selecting the trained model on a basis of the image characteristics of the radiographic image of the jig and image characteristics of the image data of the one or more training images used to construct the plurality of trained models, the image characteristics of the image data of the one or more training images are at least one of energy characteristics, noise characteristics, and frequency characteristics, and the image characteristics of the radiographic image of the jig and the image characteristics of the image data of the one or more training images are a same image characteristics.

4. The radiographic image processing method according to claim 1, wherein specifying the image characteristics of the radiographic image of the jig includes specifying image characteristics of a plurality of images obtained as a result of applying the plurality of trained models to the radiographic image of the jig, and
selecting the trained model includes selecting the trained model on a basis of the image characteristics of the plurality of images.

5. The radiographic image processing method according to claim 4, wherein the image characteristics of the radiographic image of the jig are resolution characteristics or a luminance to noise ratio, and
selecting the trained model includes selecting the trained model used to generate an image having relatively excellent resolution characteristics or a luminance to noise ratio.

6. The radiographic image processing method according to claim 1, wherein the machine training is deep learning.

7. A radiographic image processing system comprising:
at least one processor configured to:
acquire a radiographic image of a jig and a radiographic image of a target object, the radiographic image of the jig and the radiographic image of the target object are acquired by using a system that radiates radiation to the target object and captures an image of the radiation passing through the target object to acquire the radiographic image of the target object,
specify image characteristics of the radiographic image of the jig,
select a trained model on a basis of image characteristics from a plurality of trained models constructed using image data of one or more training images, through a machine training in advance, and
execute an image processing for removing noise from the radiographic image of the target object using the selected trained model.

8. The radiographic image processing system according to claim 7, wherein the at least one processor selects the trained model by comparing the image characteristics of the radiographic image of the jig with image characteristics specified from the image data of the one or more training images used to construct the plurality of trained models.

9. The radiographic image processing system according to claim 8, wherein the image characteristics of the radiographic image of the jig are at least one of energy characteristics, noise characteristics, and frequency characteristics, and the at least one processor selects the trained model on a basis of the image characteristics of the radiographic image of the jig and image characteristics of the image data of the one or more training images used to construct the plurality of trained models, the image characteristics of the image data of the one or more training images are at least one of energy characteristics, noise characteristics, and frequency characteristics, and the image characteristics of the radiographic image of the jig and the image characteristics of the image data of the one or more training images are a same image characteristics.

10. The radiographic image processing system according to claim 7, wherein the at least one processor specifies image characteristics of a plurality of images obtained as a result of applying the plurality of trained models to the radiographic image of the jig, and the at least one processor selects the trained model on a basis of the image characteristics of the plurality of images.

11. The radiographic image processing system according to claim 10, wherein the image characteristics of the radiographic image of the jig are resolution characteristics or a luminance to noise ratio, and the at least one processor selects the trained model used to generate an image having relatively excellent resolution characteristics or a luminance to noise ratio.

12. The radiographic image processing system according to claim 7, wherein the machine training is deep learning.

13. The radiographic image processing system according to claim 7, further comprising:

a source configured to radiate radiation to the target object; and a detector configured to capture the image of the radiation passing through the target object and acquire the radiographic image of the jig and the radiographic image of the target object.

14. A non-transitory computer-readable media storing a radiographic image processing program, which, when executed by a processor, causes the processor to execute a method comprising:

acquiring a radiographic image of a jig and a radiographic image of a target object using a system that radiates radiation to the target object and captures an image of the radiation passing through the target object to acquire the radiographic image of the target object;

specifying image characteristics of the radiographic image of the jig;

selecting a trained model on a basis of image characteristics from a plurality of trained models constructed using image data of one or more training images, through a machine training in advance; and executing an image processing for removing noise from the radiographic image of the target object using the selected trained model.

\* \* \* \* \*